US009654406B2

(12) United States Patent
Chen et al.

(10) Patent No.: US 9,654,406 B2
(45) Date of Patent: May 16, 2017

(54) COMMUNICATION TRAFFIC PROCESSING ARCHITECTURES AND METHODS

(71) Applicant: CORTINA SYSTEMS, INC., Sunnyvale, CA (US)

(72) Inventors: Charles Chen, Fremont, CA (US); Ryan Patrick Donohue, Sunnyvale, CA (US); Donggun Keung, Milpitas, CA (US); Xi Chen, Fremont, CA (US); Xiaochong Cao, Fremont, CA (US); Zeineddine Chair, Redwood City, CA (US)

(73) Assignee: REALTEK SINGAPORE PTE LTD, Singapore (SG)

( * ) Notice: Subject to any disclaimer, the term of this patent is extended or adjusted under 35 U.S.C. 154(b) by 743 days.

(21) Appl. No.: 14/135,111

(22) Filed: Dec. 19, 2013

(65) Prior Publication Data

US 2014/0181319 A1 Jun. 26, 2014

Related U.S. Application Data

(60) Provisional application No. 61/745,951, filed on Dec. 26, 2012.

(51) Int. Cl.
*G06F 15/16* (2006.01)
*H04L 12/801* (2013.01)
*G06F 13/38* (2006.01)
*H04L 29/08* (2006.01)
*H04L 29/06* (2006.01)

(52) U.S. Cl.
CPC ............ *H04L 47/33* (2013.01); *G06F 13/385* (2013.01); *H04L 69/12* (2013.01); *H04L 69/08* (2013.01); *H04L 69/321* (2013.01)

(58) Field of Classification Search
CPC ...................................................... G06F 13/385
USPC ................................................. 709/203, 234
See application file for complete search history.

(56) References Cited

U.S. PATENT DOCUMENTS

| 5,619,697 | A | 4/1997 | Nishida | |
|---|---|---|---|---|
| 6,754,749 | B1 * | 6/2004 | Mounsef | G06F 15/7867 709/229 |
| 6,976,205 | B1 * | 12/2005 | Ziai | H04L 69/16 714/807 |
| 8,054,744 | B1 * | 11/2011 | Bishara | H04L 47/2441 370/229 |
| 2004/0057458 | A1 | 3/2004 | Kil et al. | |
| 2004/0205273 | A1 | 10/2004 | Mowery et al. | |

(Continued)

FOREIGN PATENT DOCUMENTS

| JP | H06243070 A | 9/1994 |
|---|---|---|
| JP | 2004104789 A | 4/2004 |
| JP | 2008517565 A | 5/2008 |

OTHER PUBLICATIONS

International Search Report and Written Opinion mailed May 27, 2014 for PCT application No. PCT/US2013/076680, 21 pages.

(Continued)

*Primary Examiner* — Duyen Doan
(74) *Attorney, Agent, or Firm* — McClure, Qualey & Rodack, LLP

(57) ABSTRACT

Communication traffic processing architectures and methods are disclosed. Processing load on main Central Processing Units (CPUs) can be alleviated by offloading data processing tasks to separate hardware.

31 Claims, 13 Drawing Sheets

(56) References Cited

U.S. PATENT DOCUMENTS

| | | |
|---|---|---|
| 2005/0060538 A1 | 3/2005 | Beverly |
| 2006/0083246 A1 | 4/2006 | Minami et al. |
| 2007/0297333 A1 | 12/2007 | Zuk et al. |
| 2009/0199216 A1 | 8/2009 | Gallagher et al. |
| 2009/0323570 A1 | 12/2009 | Ginzburg et al. |
| 2013/0003549 A1* | 1/2013 | Matthews ........... H04L 41/0668 370/235 |
| 2013/0329557 A1* | 12/2013 | Petry .................. H04L 63/0272 370/235 |
| 2014/0156867 A1* | 6/2014 | Davari ................... H04L 45/44 709/238 |

OTHER PUBLICATIONS

Akiba. "Feeding the Shark—Turning the Freakduino into a Realtime Wireless Protocol Analyzer with Wireshark", Dec. 29, 2010, retrieved from the Internet: <URL: http://www.freaklabs.org/index.phplTutorials/Software/Feeding-the-Shark-Turning-the-Freakduino-into-a-Realtime-Wireless-Protocol-Analyzer-with-Wireshark.html>, 17 pages.

* cited by examiner

COMMUNICATION TRAFFIC PROCESSING ARCHITECTURES AND METHODS

CROSS-REFERENCE TO RELATED APPLICATION

This application is related to, and claims the benefit of, U.S. Provisional Patent Application Ser. No. 61/745,951 filed on Dec. 26, 2012, the contents of which are incorporated in their entirety herein by reference.

FIELD OF THE INVENTION

This invention relates generally to communications and, in particular, to communication traffic processing.

BACKGROUND

The emergence of such technologies as Internet Protocol Television (IPTV) technology and the convergence of Digital Video Broadcast (DVB), router gateways, and Digital Video Recorder (DVR) Set Top Boxes (STBs) place ever increasing demands on processing platforms.

BRIEF DESCRIPTION OF THE DRAWINGS

Examples of embodiments of the invention will now be described in greater detail with reference to the accompanying drawings.

DETAILED DESCRIPTION

Multi-service processing is provided in a single delivery platform that can deliver simultaneous line rate bandwidth for secured data, voice, video, and mobile services without service degradation.

Data networking and application processing are integrated together into a single chip or integrated circuit package. Features may include flexible hardware design, multiple data interfaces, one or more general-purpose main processors in combination with offload hardware, and efficient inter-processor communications.

A special-purpose processor, multiple processors, and/or specialized hardware could be provided to enable hardware offload or acceleration for processing-intensive functions. This approach offloads functions from primary general-purpose processors, also referred to as application processors or main CPUs, reserving CPU processing power for additional value-added services, for example.

General-purpose main Central Processing Units (CPUs) in a processing platform may be loaded to such a degree in performing networking or data communication tasks that remaining capacity for performing other tasks such as application- or service-related tasks suffers. Maintaining performance in respect of networking may come at a cost of limited or degraded application or service performance. For example, networking tasks could occupy 75-80% of main CPU processing cycles, leaving limited resources available for application or service processing.

Such high utilization of main CPU resources could also have an impact on power consumption and/or operating temperature. The main CPU in an STB, for example, would be one of the higher-power components, and likely the component with the highest potential power consumption, in such a device. Actual power consumption by a CPU depends on its utilization, and accordingly a high utilization would have a high associated power consumption. High utilization also increases heat generation, placing additional demand on heat sinks or other temperature control measures. Significant efficiencies can be gained through the use of special purpose, reconfigurable engines as disclosed herein.

Processing Architecture Example

Figure 1:
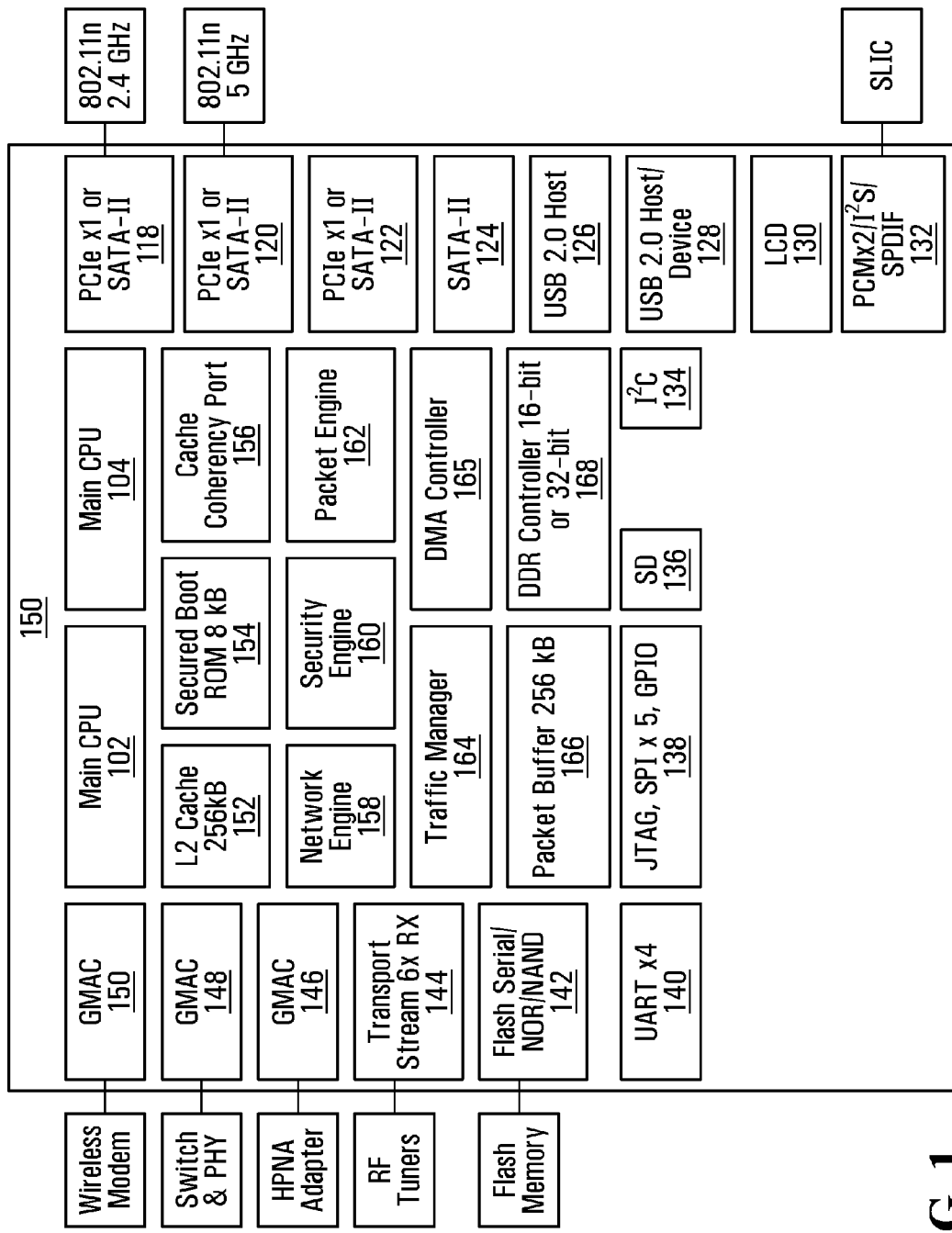
FIG. 1 is a block diagram of an example processing architecture.

FIG. 1 is a block diagram of an example processing architecture. The example architecture 100 shown in FIG. 1 is a dual-processor main CPU architecture with two main CPUs 102, 104. Any of various interfaces may also be provided. In the example architecture 100, there are multiple interfaces. These include:

three Peripheral Component Interconnect express (PCIe) or Serial Advanced Technology Attachment (SATA) interfaces 118, 120, 122, which represent three sets of PCIe controllers and SATA controllers that share the same physical layer (PHY) interface components;
a SATA interface 124;
a USB Host interface 126;
a Universal Serial Bus (USB) Host/Device interface 128;
a Liquid Crystal Display (LCD) interface 130;
a Synchronous Serial Port (SSP) interface 132 that is configurable as a Pulse-Code Modulation (PCM) interface supporting either a single interface or two simultaneous PCM interfaces, an Inter-IC Sound (I²S) bus interface, or a Sony/Philips Digital Interconnect Format (SPDIF) interface;
an I²C (Inter-IC) bus interface 134;
a Secure Digital (SD) interface 136;
a bank of interfaces 138 including examples of a Joint Test Action Group (JTAG) interface, a Serial Peripheral Interface (SPI) with up to 5 chip selects in this example, and a General Purpose Input Output (GPIO) interface;
four Universal Asynchronous Receiver/Transmitter UART interfaces 140;
a Flash memory interface 142;
a Transport Stream receive (Rx) interface 144, which in this example supports up to 6 transport streams; and
Gigabit Media Access Controller (GMAC) interfaces 146, 148, 150.

FIG. 1 also shows examples of components to which some of these interfaces might be coupled when deployed in an STB, for example. In the example shown, these components include 802.11n wireless modules, a Subscriber Line Interface Controller (SLIC), flash memory, Radio Frequency (RF) tuners, a Home Phone Networking Alliance (HPNA)

adapter, switch and physical layer (PHY) components, and a wireless modem. Other types of components could be coupled to the interfaces in other embodiments, in addition to or instead of those shown in FIG. 1.

The example architecture 100 can also include a 256 kB L2 cache 152, an 8 kB secured boot Read Only Memory (ROM) 154, a Cache Coherency Port 156, a network engine 158, a security engine 160, a packet engine 162, a traffic manager 164, a Direct Memory Access (DMA) controller 165, a 256 kB packet buffer 166, and a 16-bit or 32-bit Double Data Rate (DDR) memory controller 168. Other sizes and/or types of memory could be provided in other embodiments, in addition to or instead of the example memory sizes and types shown in FIG. 1.

It should be appreciated that the example architecture 100 of FIG. 1, as well as the contents of the other drawings, are intended solely for illustrative purposes, and that the present disclosure is in no way limited to the particular example embodiments explicitly shown in the drawings and described herein.

All of the components in the example architecture 100 may be integrated into the same chip or integrated circuit package, or across multiple integrated circuits. A single chip or package then includes both networking and data processing components. For example, specific processing tasks can be assigned to less powerful and more power efficient processors in the network engine 158, the security engine 160, and/or the packet engine 162, thereby making processing cycles in the more powerful general-purpose main CPUs 102, 104 available for performing other tasks such as application- or service-related tasks.

This type of architecture can be more power efficient by reducing main CPU 102, 104 utilization for tasks that can be performed in less powerful processors that are optimized for their specific tasks. Performance gains can also be realized by making more main CPU 102, 104 processing cycles available for performing other tasks.

For instance, supposing that security tasks are offloaded from the main CPUs 102, 104 to the security engine 160, the main CPUs then have more processing cycles available for application- or service-related tasks. While a device with a main CPU architecture might provide for similar or even the same data rates as a device with an architecture based on the example architecture 100, a device with an architecture based on the example architecture 100 might support more feature-rich applications or services and/or better application/service response times as a result of better main CPU availability, due to task offloading to one or more engines 158, 160, 162.

This is illustrative of hardware acceleration features for higher performance in service provider networks. In an embodiment, hardware acceleration features are accessed through customized software device drivers, which make the hardware transparent to upper layer software components and applications. Under a Linux environment, for instance, open source drivers and a slightly modified kernel could be used. This allows users to further customize the kernel and run software applications on top of a Linux environment. Other operating systems can be supported using this type of hardware abstraction approach.

The example architecture 100 integrates acceleration hardware for networking operations in the network engine 158, security in the security engine 160, and packet handling operations such as transport stream frame aggregation in the packet engine 162. Networking operations could include, for example, one or more of: classification and Access Control List (ACL) handling, Virtual Local Area Network (VLAN) operations, Quality of Service (QoS) illustratively through the Linux QDisc model, forwarding, Network Address Translation (NAT)/Netfilter operations, multicasting, and/or queuing/scheduling. Features and related processing that could be offloaded from the main CPUs 102, 104 to the security engine 160 in the example architecture 100 could include one or more of: Internet Protocol Security (IPSec), Digital Transmission Content Protection (DTCP), Secure Real-time Transport Protocol (SRTP), and/or Secure Sockets Layer (SSL).

The foregoing provides a general description of an example architecture 100 as shown in FIG. 1. Further details are discussed by way of example below.

Processor Complex

In an embodiment, each of the main processors 102, 104 is a commercially available general-purpose processor. Illustrative processor speeds are 600 MHz to 750 MHz. 32 kB Layer 1 or L1 Instruction (I) and Data (D) caches 110, 112 and 114, 116 are shown in FIG. 1. The main CPUs could support other features such as software acceleration for reduced code size and application acceleration, Asymmetric Multi-Processing (AMP) and Symmetric Multi-Processing (SMP) for single- or multi-Operating System (O/S) applications, Single Instruction Multiple Data (SIMD) Instruction Set for graphics/computation processing, JTAG/Program Trace Interface (PTM), performance monitoring, and/or buffering to accelerate virtual address translation, for example. The present disclosure is not limited to any specific main CPU or type of main CPU. Also, although the example architecture 100 is a dual-CPU architecture, aspects of the present disclosure could be applied in single-CPU architectures and/or in architectures with more than two main CPUs.

Configuration of the main CPUs 102, 104 in one embodiment involves setting configuration parameters in configuration registers. When each main CPU 102, 104 boots up after reset, it will read its configuration parameters. These parameters may also provide a default configuration of the L2 cache 152 in addition to the default configuration for the main CPU cores 102, 104. To change configuration parameters, the appropriate registers are modified and a restart or reset is issued to one or both of the main CPUs 102, 104. In an embodiment, registers in the system are memory mapped. Configuration parameters could then be modified by writing to an address that each register has been assigned in the memory space.

Figure 2:
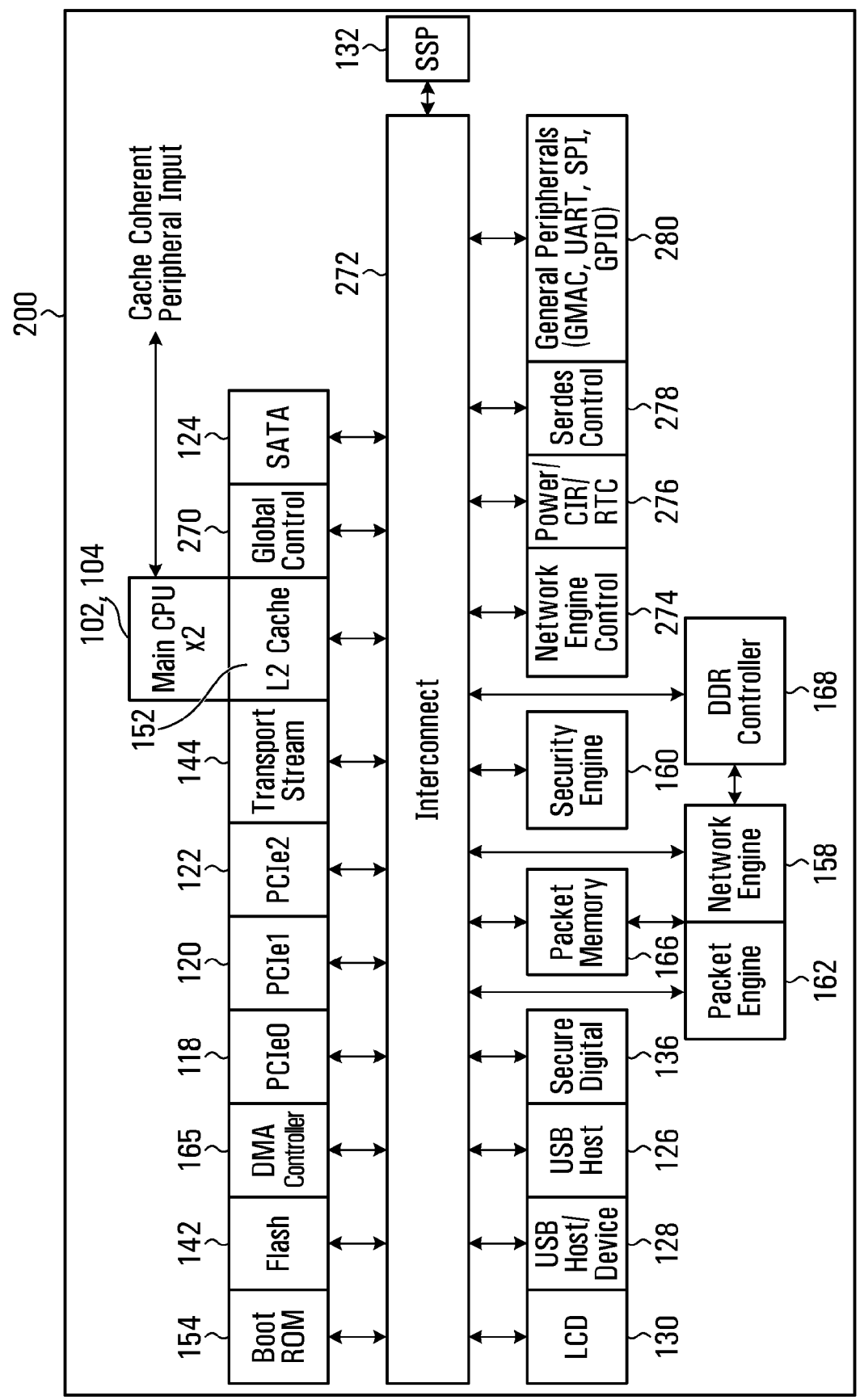
FIG. 2 is a block diagram of an example processor complex.

FIG. 2 is a block diagram of an example processor complex. This example 200 includes many of the components shown in FIG. 1, with some additional components. The additional components include:
  a global control interface 270, through which interrupts and/or other control signals could be provided to main CPUs 102, 104 and other components;
  a dynamic controllable, flexible interconnect 272 which could be implemented using one or more switching fabrics, for example;
  a network engine control module 274;
  a power/Consumer Infrared (CIR)/Real Time Clock (RTC) interface 276 to enable manual on/off switching, control through an infrared remote control device, and timer-based control;
  a serializer/deserializer (SerDes) controller 278 through which the main CPUs 102, 104 and/or other components to control configuration of SerDes components as described further hereinbelow; and a "General Peripherals" block 280 which generally designates peripheral interfaces such as the GMAC, UART, SPI, and GPIO interfaces shown in FIG. 1.

As shown in FIG. 2, the main CPUs 102, 104 are coupled to the various interfaces, and any peripherals which are connected to those interfaces, through the flexible interconnect 272. The network engine 158, the security engine 160, and the packet engine 162 are also coupled to the interfaces and peripherals through the flexible interconnect 272, and may communicate with and control those peripherals directly. Through the flexible interconnect 272, any processor in the system, including the main CPUs 102, 104 and separate "offload" processors or hardware in an offload subsystem implementing the network engine 158, the security engine 160, and/or the packet engine 162, for example, can control any resource in the system. This allows system software to allocate which processors will control which inputs/outputs (I/Os) at run time. This in turn enables the separate offload processors or hardware to take control of high bandwidth SerDes I/Os such as PCIe interfaces when associated processing is offloaded from the main CPUs 102, 104.

FIG. 2 also shows a cache coherent peripheral input at the main CPUs 102, 104. In an embodiment, each of the main CPUs 102, 104 has a Cache Coherency Port. To provide full I/O coherency, certain memory addresses can be assigned to the Cache Coherency Port. Reads on the Cache Coherency Port may hit in any main CPU's L1 data cache, and writes on the Cache Coherency Port may invalidate any stale data in the L1 cache and write through to the L2 cache 152. This can provide significant system performance benefits and power savings, and can also simplify driver software. A device driver no longer needs to perform cache cleaning or flushing to ensure the L2/L3 memory system is up-to-date. Cache coherency is discussed in further detail below.

Network Engine

The network engine 158 shown in FIGS. 1 and 2 may provide such features as high speed packet forwarding, editing, queuing, shaping, and policing. The network engine 158 can switch, route, and perform packet services such as Point-to-Point Protocol over Ethernet (PPPoE) tunnelling and Transmission Control Protocol (TCP) segmentation without main CPU intervention, thereby offloading these networking tasks from the main CPUs 102, 104.

Figure 3:
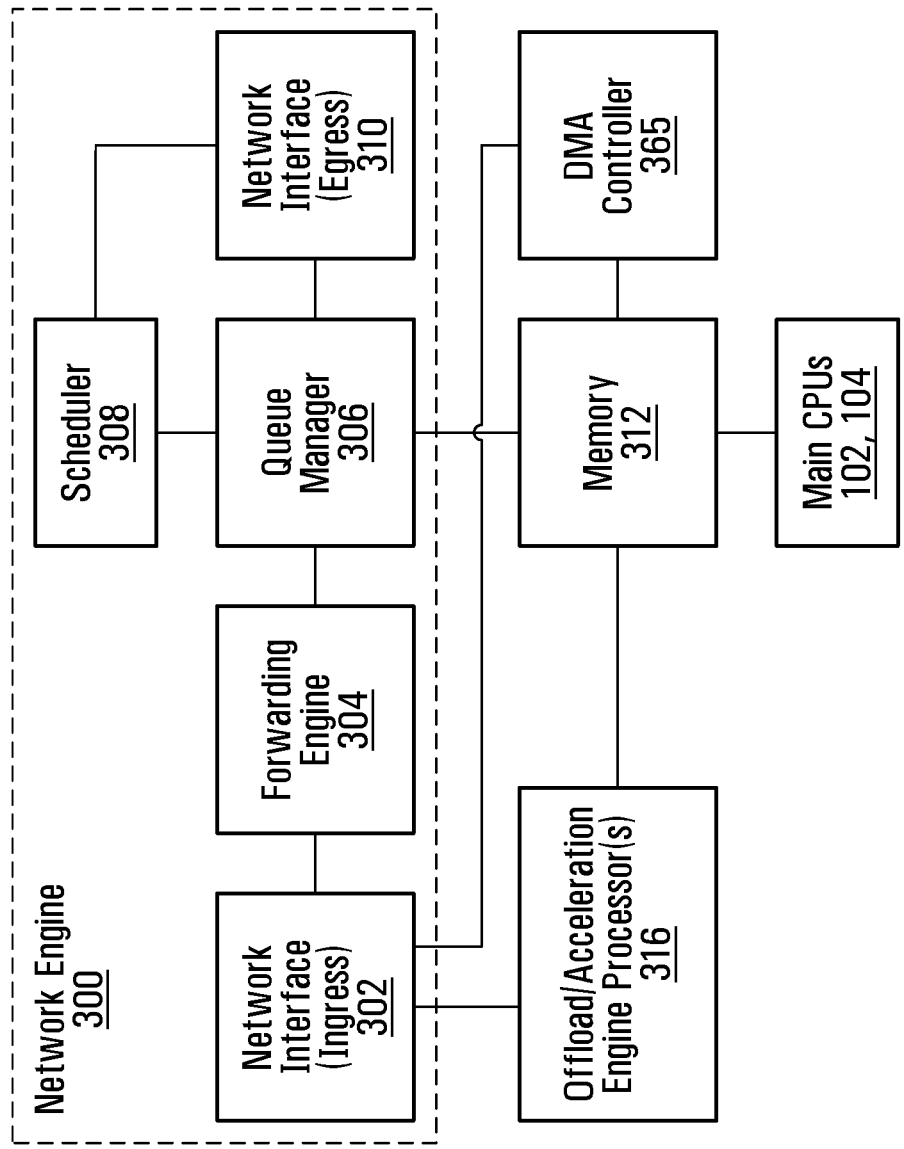
FIG. 3 is a block diagram of an example network engine.

FIG. 3 is a block diagram of an example network engine. The example network engine 300 includes ingress and egress network interfaces 302, 310, a forwarding engine 304, a queue manager 306, and a scheduler 308. In an embodiment, the example network engine 300 is implemented in configurable but hard-coded hardware.

For ease of reference, other components with which the example network engine 300 interacts are also shown. These other components include memory 312, one or more offload/acceleration engine processors 316, the DMA controller 165, and the main CPUs 102, 104. The memory 312 includes one or more memory devices. In an embodiment, the memory 312 includes DDR memory.

In an embodiment, the example network engine 300 may use multiple forwarding tables to accomplish packet forwarding schemes in the Linux IP stack. Both Linux rule and flow tables may be implemented in hardware. The rule tables are based on information found in a current packet. Some rule based entries, such as firewall entries, could be configured by system software before traffic begins to flow. Adaptation to other operating systems or custom forwarding stacks can be accommodated.

Flow tables may be programmed by system software when the first packet in a flow is received, and every following packet for that flow can then be handled by the example network engine 300 with no intervention by the main CPUs 102, 104. An unmatched packet could be sent to the main CPUs 102, 104 to drop or initiate a learning process based on a filtering option. Packets in selective flows could be forwarded to the main CPUs 102, 104, for example, if the payload associated with flows requires deeper packet inspection, if the total number of hardware flows for acceleration using the example network engine 300 exceeds a certain number of hardware flows, and/or if the number of hardware lookups based on any packet fields in any combination exceeds a certain number of lookups. In an embodiment, the example network engine supports up to 8192 hardware flows and 12000 hardware lookups before selective flows are forwarded to the main CPUs 102, 104. Hardware acceleration using the example network engine 300 could also be turned on or off on a per-flow/rule basis.

Linux-based flow connections can be established by the kernel and then programmed into hardware tables. This network engine model allows the Linux kernel and networking applications to make all decisions for new flows.

Data flows or flows as referenced herein may be associated with data that shares some sort of common characteristic. For example, certain data processing tasks might be performed on a certain type of data. A data flow for that type of data could then be configured when that data type is first encountered and identified by the main CPUs 102, 104 as disclosed herein, so that subsequently received data of that type can be identified as being associated with a known data flow and processed accordingly in an offload subsystem without involvement of the main CPUs. Data type is one illustrative example of a characteristic or pattern that could differentiate different data flows. Other examples include sending or source address(es) and/or destination address(es).

Operation of the example network engine 300 is further illustrated by way of the following example.

Suppose that a packet arrives into the ingress network interface 302, illustratively through one of the Ethernet GMAC interfaces 146, 148, 150 (FIG. 1), but is not part of a known traffic flow. An unknown flow could be dropped or forwarded to the main CPUs 102, 104 to be inspected. If the packet is dropped, then nothing further would happen. For the purposes of illustration, this example considers a scenario in which the received packet is forwarded to the main CPUs 102, 104 for inspection.

In an embodiment, the packet has arrived on what is called a Physical Source Port ID (PSPID) and the packet, some early L2 parse information, and timestamp are passed to the forwarding engine 304. The forwarding engine 304 may perform several stages of lookups:

A PSPID→Logical Source Port ID (LSPID) Mapping—this mapping might apply, for example, where there is a transition between physical and virtual ports in the case of port aggregation, for instance. The forwarding engine 304 itself understands LSPID while the network interface 302 works on PSPIDs in this example.

Packet Classification—if the packet is headed upstream or from a user port (User Network Interface—UNI) upstream or the packet is coming from the service provider side of the network downstream, for example, then classification is performed on the packet. From classification, a service or a general operation on the packet is determined.

In an embodiment, a service database or SDB sets the types of searches that will be performed on the packet, as well as some overall configuration, based on the forwarding classification.

Hash and longest prefix match searches happen next. These can determine how to forward the packet, how to set QoS, etc. They in turn point to IP and Media Access Control (MAC) address tables to decide what to substitute in the packet header if NAT is required.

There is also a VLAN membership table to assign ports as members of VLANs for layer two forwarding searches, in an embodiment.

Finally, VLAN and QoS result tables allow the modification of packets for adding/removing VLANs as well as changing the QoS values.

Results of the lookups are decided based on their hits and priority mapping between those results. Based on results of the forwarding lookups, the forwarding engine 304 may modify the packet for transmission. Even if the packet header is not modified, the aspects of the packet getting forwarded (to a main CPU queue for example), policing indices etc., could be determined and taken into account.

Forwarding results could be varied or over-ridden based on ACLs. As an example, an ACL could be set up to observe packet type and override any forwarding engine action that is different from a default action in the ACL. ACL entries could also be logically chained together. For example, several ACL entries could be written for different actions, with their results "AND"ed together to form a superset of those ACL rules.

Returning to the example of a packet from an unknown flow, and presuming for the purposes of illustration that there is no ACL that specifies a different action, since this particular packet misses a normal forwarding to a forwarding engine port (it is not part of a known flow in this example), it is placed into a Virtual Output Queue (VOQ) that is meant for the main CPUs 102, 104. This enqueuing is through the queue manager 306 and into the memory 312 in the example shown in FIG. 3. The packet will reside in the VOQ until it is dequeued as ordered by the scheduler 308 for scheduling the packet out of the main CPU queue.

Once the scheduler 308 dequeues the packet, the main CPUs 102, 104 dequeue the packet from the queue in the memory 312, either through an interface to the memory or the DMA controller 165. The packet is then analyzed by the main CPUs 102, 104. For the purposes of this example, suppose that inspection of the packet identifies a new flow, and the main CPUs 102, 104 decide that the packet should be forwarded on to a forwarding engine 304 port with some transformation. The forwarding engine 304 allows the transformed packet to pass through on that port. The main CPUs 102, 104 could instead forward the transformed packet out at this point so that it is not lost, or wait until the next frame if frame loss is not a concern. As noted above, the flexible interconnect 272 (FIG. 2) enables any processor in the system, including a main CPU 102, 104 and an offload subsystem, to communicate with and assume control of any resource, and thus the main CPUs 102, 104 could forward the transformed packet. The main CPUs 102, 104 would also update the flow table in this example.

The next time the same type of packet is received on the ingress network interface 302, the forwarding engine 304 now has a hit in the forwarding table (after classification), the previously determined packet transformation takes place and the packet is modified, and the outbound VOQ is marked to an egress network interface 310 port, illustratively an Ethernet port.

The packet is now enqueued into a queue manager 306 hardware VOQ which will be dequeued by the scheduler 308 in due time. The upstream or downstream VOQ as configured in the scheduler 308 dequeues the packet destined for an Ethernet port. The queue manager 306 passes the packet on to the egress network interface 310. As the packet is dequeued, an error check could be performed, illustratively by checking a Cyclic Redundancy Check (CRC) code, to make sure that an error of memory (soft error) has not taken place on the packet. The error check could be performed by the queue manager 306 or another element. If the error check does not pass, the packet could optionally have its CRC code stamped as being invalid as it is sent out to ensure the other side will receive an error and drop the frame. The packet is then queued on a transmit port and sent out.

As noted above, packets may be transformed during the forwarding process. Packet transformation or editing functions could include, for example:

- source and destination port modification for TCP and User Datagram Protocol (UDP) packets
- PPPoE/PPP Header Insertion/Removal
- MAC Source Address (SA)/Destination Address (DA) modification and substitution
- IP Source/Destination Address modification for IPv4 and IPv6
- Preservation of current IP options and/or extension headers
- QoS field modifications such as IEEE 802.1p/Differentiated Services Code Point (DSCP)—Type of Service (ToS)
- VLAN operations on one or two VLAN pairs (QinQ support)
- Update of IPv4 header checksum
- Update of L4 (TCP or UDP) header checksum.

Consider an example of PPPoE/PPP Encapsulation/Decapsulation. This example illustrates not only packet transformation, but also interactions between the forwarding engine 304 and the offload/acceleration engine processor(s) 316.

When software running on the main CPUs 102, 104 receives the first PPPoE packet in a flow, it configures a flow in flow tables of the forwarding engine 304 to remove the PPPoE/PPP header from a Wide Area Network (WAN) interface. It then configures another flow in the forwarding engine 304 flow tables to add a PPPoE/PPP header for traffic destined for the WAN, and henceforth every packet in this flow is handled solely by hardware.

To decapsulate PPPoE/PPP packets, the forwarding engine 304 sets a bit in the packet header to inform the packet engine (supported by the offload/acceleration engine processor(s) 316 in this example) to convert the packet from PPPoE/PPP to IPv4/IPv6. The packet must have an Ethertype of 0x8864 or a PPP type of either 0x0021 or 0x0057 before it can be converted to an IPv4 or IPv6 packet. During the conversion, the Ethertype is replaced with either 0x0800 for IPv4 or 0x86DD for IPv6. The next 6 bytes, the PPPoE Header (V, T, Code, Session ID, and Length) and PPP type are all stripped.

Packet decapsulation works with VLAN tagged packets. The packet engine may also be able to parse the IP portion of the packet beyond the encapsulated PPP type. This allows IP/VLAN/MAC operations for PPPoE/PPP packets.

IP/VLAN and MAC operations are available under the packet engine, which is responsible for encapsulating packets into PPPoE/PPP in this example. The forwarding engine 304 can identify which packet to encapsulate based on its flow result. The packet engine can then use the session ID from the flow, which is also supplied with the inner packet's IP version, to encapsulate the packet. The Ethertype and PPPoE fields including version, type, and code are configured in the forwarding engine 304 in this example.

The following is an example of a field setup:
Version=1
Type=1
Code=0.

The PPPoE Version, Type, and Code fields make up a 16-bit header that is inserted into the original packet by the Packet Engine for encapsulation. The session ID, length, and PPP_Type are also inserted. The length field is the length of the packet including the PPPoE header and the rest of the packet.

In this example, the main CPUs 102, 104 are involved in initial flow identification and configuration of the forwarding engine 304 flow tables. Once the flow tables have been configured, encapsulation/decapsulation tasks and security tasks if any, are performed by the offload/acceleration processor(s) 316. The encapsulation/decapsulation and security tasks are examples of data processing tasks as disclosed herein, and can occupy many processing cycles on the main CPUs 102, 104, leaving fewer processing cycles available for other tasks. Offloading these tasks to the offload/acceleration processor(s) 316 reduces the processing load on the main CPUs 102, 104 for performing data processing tasks.

Interaction of the offload/acceleration engine processor(s) 316 with the forwarding engine 304 may be through VOQs, as described above in the context of packets being forwarded to the main CPUs 102, 104 for inspection. In an embodiment, there is one port for the packet engine and one port for the security engine, and each of these ports has eight queues controlled by the scheduler 308 and settable as destination VOQs. Once a packet arrives in the packet engine, or similarly the security engine, the packet is processed and may have its header modified by the packet engine, be encrypted or decrypted by the security engine, etc. Ultimately a processed packet can be moved out the packet engine port or security engine port or back out to the memory 312, illustratively through an onboard local DMA controller of the offload/acceleration engine processor(s) 316. This type of port and queue arrangement provides for efficient inter-processor communications, between the main CPUs 102, 104 and the offload/acceleration engine processor(s) 316 in this example.

Considering queuing in more detail, the example network engine 300 uses VOQs, as noted above, to identify which packet queue stores a packet while awaiting transmission. In an embodiment, there are 112 VOQs. When packets are received by any source such as the GMACs 146, 148, 150 (FIG. 1), the main CPUs 102, 104, or other sources, they are passed to the forwarding engine 304, which ultimately decides if the packet is to be dropped or forwarded (modified if appropriate). If a packet is to be forwarded, then the forwarding engine 304 identifies the queue which is to hold the packet until it is scheduled to leave by the scheduler 308. For operating systems such as Linux, this could be controlled by the Traffic Control module which allows for the scheduling of packets.

There could be multiple queues per port, to provide QoS for priority traffic such as voice, video, and controlled messages, for example. In an embodiment, queues are provided for all gigabit ports, packet engines (for tasks such as IP fragmentation reassembly, IPSec, etc.), packet replication (root scheduler), and the main CPUs 102, 104. The main CPUs 102, 104 could also have a large number of queues to support various priorities for different types of traffic. User types could be classified to support higher-end enterprise-type applications, for example.

The queue manager 306 in the example network engine 300 accepts packets from the forwarding engine 304 and stores them into queues in the memory 312. The queue manager 306 could be configured to maintain priority and class of service as it manages memory buffers.

The scheduler 308 may provide such features as:
Strict Priority (SP) services
Deficit Round-Robin (DRR) Scheduling services
Root Queue support for multicast services
combinational hierarchy of SP/DRR queues per physical port
a main scheduler that handles port, root queue, and main CPU schedulers.

Any of various scheduling types, and possibly multiple scheduling types, could be provided by the scheduler 308. In an embodiment, the scheduler 308 implements hierarchical scheduling. For example, a root queue scheduler, a main CPU scheduler, and per-port schedulers could all schedule traffic queues to a top-level scheduler. The lower-level schedulers could each schedule SP queues and DRR queues. A DRR scheduler could schedule traffic from DRR queues, with SP queues and DRR-scheduled queues subsequently being scheduled in a next-level SP or DRR scheduler which feeds into the top-level scheduler. Per-port schedulers could feed into a further next-level scheduler for all of the ports, illustratively a Round Robin (RR) scheduler, which feeds into the top-level scheduler.

SP scheduling services all queues according to their priority. Higher priority queues are serviced before lower priorities. Voice and video applications can be serviced with low jitter, latency, and packet loss in the high-priority queues. While SP scheduling serves high-priority applications well, lower priority packets might be starved. To overcome this problem, packet policers and/or shapers could be used for the highest priority services, with DRR scheduling for the rest. Using DRR allows bandwidth to be shared across all services while maintaining QoS. Weights can be applied to different priorities according to user requirements.

Although not specifically shown in FIG. 3, a traffic manager 164 (FIG. 1) could be used to control policing of packets and queuing parameters. It could also provide the ability to decide when to send pause frames on a link based on queue depth, and/or other traffic management functions.

In an embodiment, congestion avoidance features are also provided. A Weighted Random Early Discard (WRED) function, for example, could determine packet drop probabilities for traffic queues based on Average Queue Depth (AQD). AQD could be calculated with a software configurable weight, and linear drop profiles could be defined by a minimum AQD, maximum AQD, and a maximum drop probability intercept point, for instance. Backpressure is another example of a feature that could be used to reduce or avoid congestion and/or packet dropping due to congestion. This type of functionality could be implemented in the queue manager 306 or possibly elsewhere.

Other features could also or instead be provided by a network engine. The foregoing is intended solely for the purposes of illustration.

Offload/Acceleration Subsystem

Figure 4:
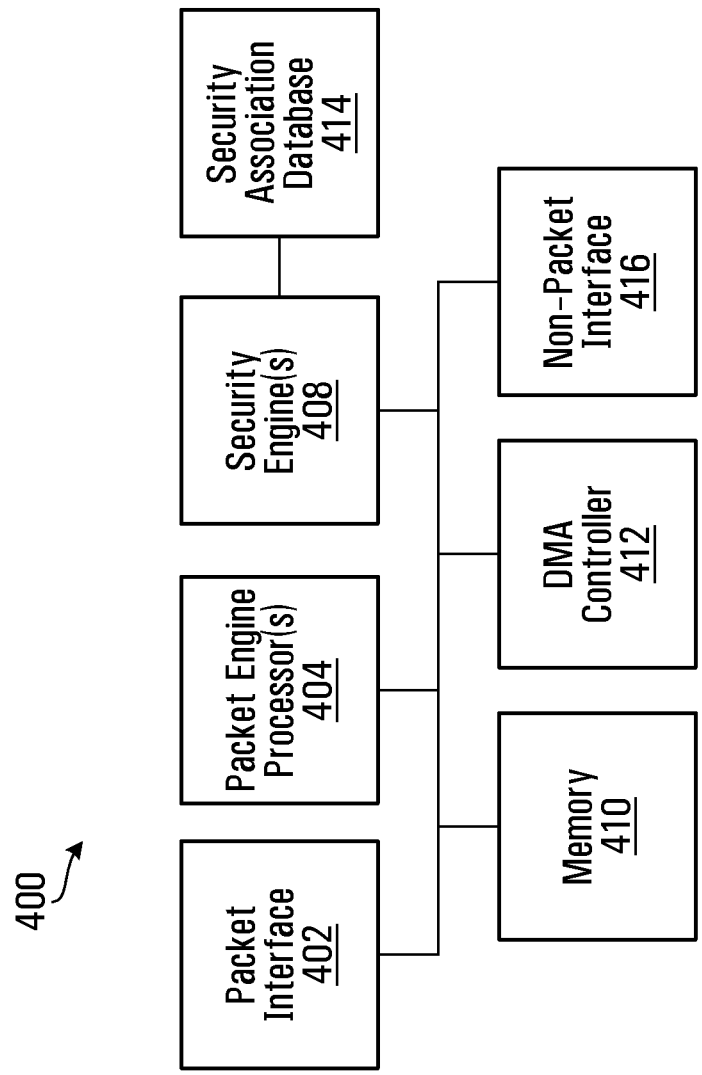
FIG. 4 is a block diagram of an example offload/acceleration subsystem.

FIG. 4 is a block diagram of an example offload/acceleration subsystem 400. The example subsystem 400 includes a packet interface 402, one or more packet engine processors 404, one or more security engines 408, a memory block 410, a DMA controller 412, a Security Association (SA) database 414, and a non-packet interface 416. Although a security engine 160 and a packet engine 162 are shown separately in FIGS. 1 and 2, the example subsystem 400 implements both of these engines.

The packet interface 402 enables the example subsystem 400 to exchange at least data, packets in this example, with other components. Through the packet interface 402, packets might be received from traffic queues for processing, and returned to the queues or other components after processing. The packet interface 402, or possibly another interface, could support exchange of other types of signals, such as backpressure signals to the scheduler 308 (FIG. 3), which as noted above schedules packets from VOQs to the offload/acceleration engine processor(s) 316, shown in FIG. 4 as the packet engine processor(s) 404. In an embodiment, the packet interface 402 provides for multiple virtual internal ports to connect to the packet engine processor(s) 404 and the security engines(s) 408. This internal interface, using ports and VOQs in one embodiment as described above, enables extremely fast turnaround for packets with multiple passes, such as IPSec, Generic Routing Encapsulation (GRE), or other tunneled or bridged frames.

The non-packet interface 416 similarly enables the example subsystem 400 to exchange at least data with other components, although in the case of the non-packet interface this data would not be in the form of packets. In an embodiment, the packet interface 402 is an Ethernet interface and the non-packet interface could include PCIe, SATA, and/or USB interfaces for example.

A packet engine processor 404, or more generally any offload processor, could be the same type of processor as the main CPUs 102, 104 (FIGS. 1 to 3) or a different type of processor. Unlike the main CPUs 102, 104, however, an offload processor such as a packet engine processor 404 is configured as a special-purpose or dedicated processor, for carrying out certain types of functions. In the example subsystem 400, these functions include packet processing functions of a packet engine. A packet engine in this example is implemented in software, stored in the memory 410 or another memory, that is executed by the packet engine processor(s) 404. The type of packet engine processor(s) 404 or other offload processor(s) could be dependent upon the specific functions that are to be offloaded from the main CPUs 102, 104. In general, main CPUs 102, 104 would be more powerful than an offload processor, so that offloading of the main CPUs does not rely on additional hardware that is nearly as complex as the hardware (the main CPUs) that is being offloaded. This also results in power savings when transferring tasks from the main CPUs to offload processor(s) or other offload hardware.

A security engine 408 in the example subsystem 400 represents a hardware implementation of security functions. In an embodiment, a security engine 408 is a configurable but hard-coded encryption core. The example subsystem 400 thus illustrates two types of offload engines, including one or more offload processors executing a software engine, in this example the packet engine processor(s) 404 executing packet engine software, and one or more hardware engines, namely the security engine 408.

The memory 410 in the example subsystem 400 can include one or more solid state memories in an embodiment. For example, the memory 410 could include multiple blocks of Static Random Access Memory (SRAM). The SA database 414 would also be stored in memory, but is shown separately from the memory 410 in FIG. 4. In an embodiment, only the security engine(s) 408, and possibly only one security engine even if multiple security engines are implemented, has full direct access the SA database 414. Other components of the example subsystem 400 and/or components of a system in which the example subsystem is implemented might have write-only access to a memory device or area in which the SA database 414 is stored.

The DMA controller 412 represents an onboard DMA controller, which provides the example subsystem 400 with access to external memory such as memory shown in FIG. 3 at 312, SRAM, and/or one or more on-chip memories. The DMA controller 412 is also shared with Linux drivers in an embodiment, for moving security keys and data to reduce latency and processing overhead.

A packet engine is a powerful and reconfigurable block that can be customized to accelerate proprietary and/or new encapsulation protocols. In an embodiment, a packet engine bridges different protocols. For example, in an embodiment, the example network engine 300 (FIG. 3) is hard-coded to handle Ethernet switching, and a packet engine bridges traffic between the network engine and other non-Ethernet interfaces. In this case, packets are received by the packet engine processor(s) 404 through the non-packet interface 416 for initial processing or translation/conversion to Ethernet, and then provided to the network engine.

Example features that could be supported by a packet engine include one or more of:
  IPSec packet handling (replay, SA changes, encapsulation, and decapsulation)
  IP fragment reassembly
  disk block encryption/decryption
  IP tunneling creation and termination
  wireless bridging, such as conversion between IEEE 802.11 and Ethernet II/IEEE 802.3.

Security-related tasks, such as disk block encryption/decryption, also involve the security engine(s) 408.

Data processing tasks, such as the examples provided above, can thus be offloaded from the main CPUs 102, 104 to the example subsystem 400, thereby reducing the load on the main CPUs for performing data processing tasks. More main CPU processing cycles are then available for performing other tasks, such as higher layer application- or service-related tasks. Offload engines, or more generally an offload subsystem that supports such engines, can also be optimized for the particular data processing tasks that are to be offloaded, thereby enabling those tasks to be performed more efficiently and faster than if they were to remain on the main CPUs 102, 104.

In an embodiment, a packet engine can have two types of users, including the main CPUs 102, 104 (for encryption support in conjunction with the security engine 408), and the network engine 158, 300 for encapsulation, encryption, bridging, and reassembly support. These users can use the security engine(s) 408, simultaneously in some embodiments, to preconfigure a number of security associations on chip for each user.

The security engine(s) 408 may support any of various algorithms, ciphers, and hashes, and security functions such as IPSec encryption/decryption, disk block encryption/decryption, base station encryption/decryption, etc.

The security engine(s) 408 are used to offload cryptographic tasks from the main CPUs 102, 104. Such tasks would be "expensive" in terms of processing load if implemented purely in software. There are two possible models that could be implemented, including one in which the main CPUs 102, 104 control the security engine(s) 408 directly, and one in which an offload processor, such as a packet engine processor 404, controls the security engine(s).

In the direct control case, software executing on the main CPUs 102, 104 would program the security engine(s) 408 to perform one or more security functions such as encryption/decryption, illustratively by using memory mapped registers that control the security engine(s). Then the main CPUs 102, 104 could provide a memory pointer which indicates the location of the one or more packets to be processed by the security engine(s) 408. The security engine(s) 408 would encrypt/decrypt or otherwise process the packet(s) and then provide the pointer back to the main CPUs 102, 104. In this example, data is shared between the main CPUs 102, 104 and the security engine(s) 408 through the exchange of memory pointers. Other data sharing or exchange mechanisms could also or instead be provided to enable offloading of security tasks to the security engine(s) 408.

For an "indirect" control embodiment where an offload processor, and not the main CPUs 102, 104, controls the security engine(s) 408, the main CPUs would indicate or otherwise provide one or more packets to be processed to the offload processor. Memory pointers could be provided to the packet engine processor(s) 404, for example. The offload processor(s) would then program the security engine(s) 408 and coordinate encryption/decryption or other security processing of the packets by the security engine(s) 408. This could involve providing memory pointers to the security engine(s) 408, and receiving memory pointers from the security engine(s) when security processing is completed. Then the offload processor(s) would indicate completion back to the main CPUs 102, 104, by providing memory pointers back to the main CPUs, for example.

It should be appreciated that the packet engine processor(s) 404 and the security engine(s) 408 are illustrative examples of offload or acceleration engines. Other embodiments could include additional and/or different engines.

For example, the packet engine processor(s) 404 could be shared processors, which are also used to execute software for other engines. Similar to the security engine(s) 408, other offload or acceleration engines could be implemented in dedicated hardware.

A linked list walker engine, a buffer allocator engine, and a SAMBA offload engine are illustrative examples of other offload or acceleration engines that could be implemented in an offload or acceleration subsystem to further enhance its functionality. These additional example engines are not shown in FIG. 4, but could be interconnected with the other components of FIG. 4 in the same manner as the packet engine processor(s) 404 and the security engine(s) 408, with the exception of the direct full access to the SA database 414 as shown for the security engine(s).

A linked list walker engine could be implemented, for example, as a hardware module that offloads the task of walking linked lists. Software which processes packets may spend a lot of time storing and retrieving packets which are placed in linked list data structures. These structures become quite convoluted and it can take many memory reads to track down a leaf node where a packet is stored. A linked list walker engine could be used to offload this processing from software executing on the main CPUs 102, 104. Instead of doing many memory reads on a linked list structure, the main CPUs 102, 104 may then provide the head of the linked list structure to the linked list walker engine, which will follow the linked list structure down to the leaf node level. Once this is done, the packet can be easily read/written by the software.

In an embodiment, a linked list walker engine could be programmed with the format of the list, such as where to find the bytes that indicate the address of the next pointer and other format information about the structure of the list. The linked list walker engine could have a number of different formats programmed, with each format being identified by an index, for example. When software running on a main CPU 102, 104 is to walk a list, it could provide to the linked list walker engine the address of the head of the list, the index number which describes the format of the list, and an indicator of what action to perform. The actions that can be performed could include, for example: inserting one or more new items to the end of the list, in which case a main CPU 102, 104 could provide a pointer to an array in memory which contains the items to insert; removing the last N items from the list, in which case a main CPU could provide a pointer to an empty array in memory which the linked list walker engine can fill; and/or other actions. The linked list walker engine signals completion to the main CPUs by setting interrupts, in an embodiment.

A buffer allocator engine could be implemented, for example, as a hardware implementation of a memory allocation call. When software running on the main CPUs 102, 104 wants to store something into memory, it might request for the kernel to allocate memory by using a memory allocation call. This call could take many main CPU cycles and happen many times per second. In an offload engine architecture, when the software needs memory it can instead request memory from the buffer allocator engine. The buffer allocator engine could be a special hardware offload engine that tracks available memory in the system, and returns the requested buffer to the software. In an embodiment, what is returned to the main CPUs 102, 104 by the buffer allocator engine is a pointer to (e.g., the memory address of) the buffer which has been allocated.

A SAMBA offload engine is an implementation which accelerates the SAMBA protocol. The SAMBA protocol allows storage such as hard disk drives to be accessed over networks. The protocol requires that networking traffic be received and processed into a format suitable for storing onto a disk. Since each received packet on a networking interface must be processed in SAMBA, it can take many CPU cycles. A SAMBA offload engine would allow the main CPUs 102, 104 to simply forward network traffic which is destined for the disk to the SAMBA offload engine. The SAMBA offload engine then processes the traffic according to the SAMBA protocol and handles all the resulting file system management, thereby reducing the processing load on the main CPUs 102, 104 by performing data processing tasks that would otherwise be performed by the main CPUs.

Detailed Examples

Wireless Fidelity (WiFi); Web Filtering

Components of a processing architecture are described above by way of example with reference to FIGS. 1 to 4. Detailed examples of embodiments which provide offload in the context of WiFi applications are described below with reference to FIGS. 5 to 8, which are block diagrams of further example processing architectures.

Figure 5:
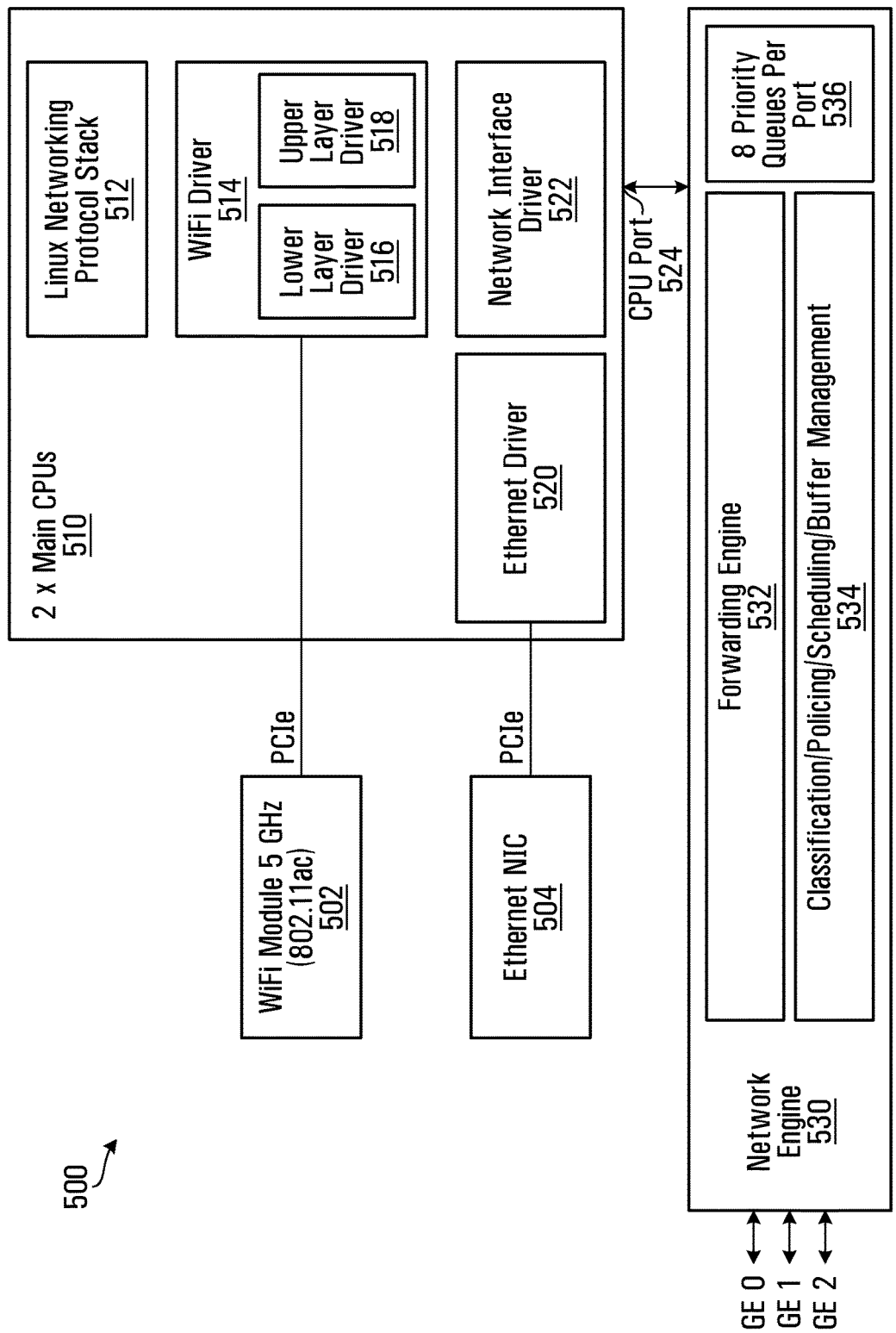
FIGS. 5 to 9 are block diagrams of further example processing architectures.
Figure 6:
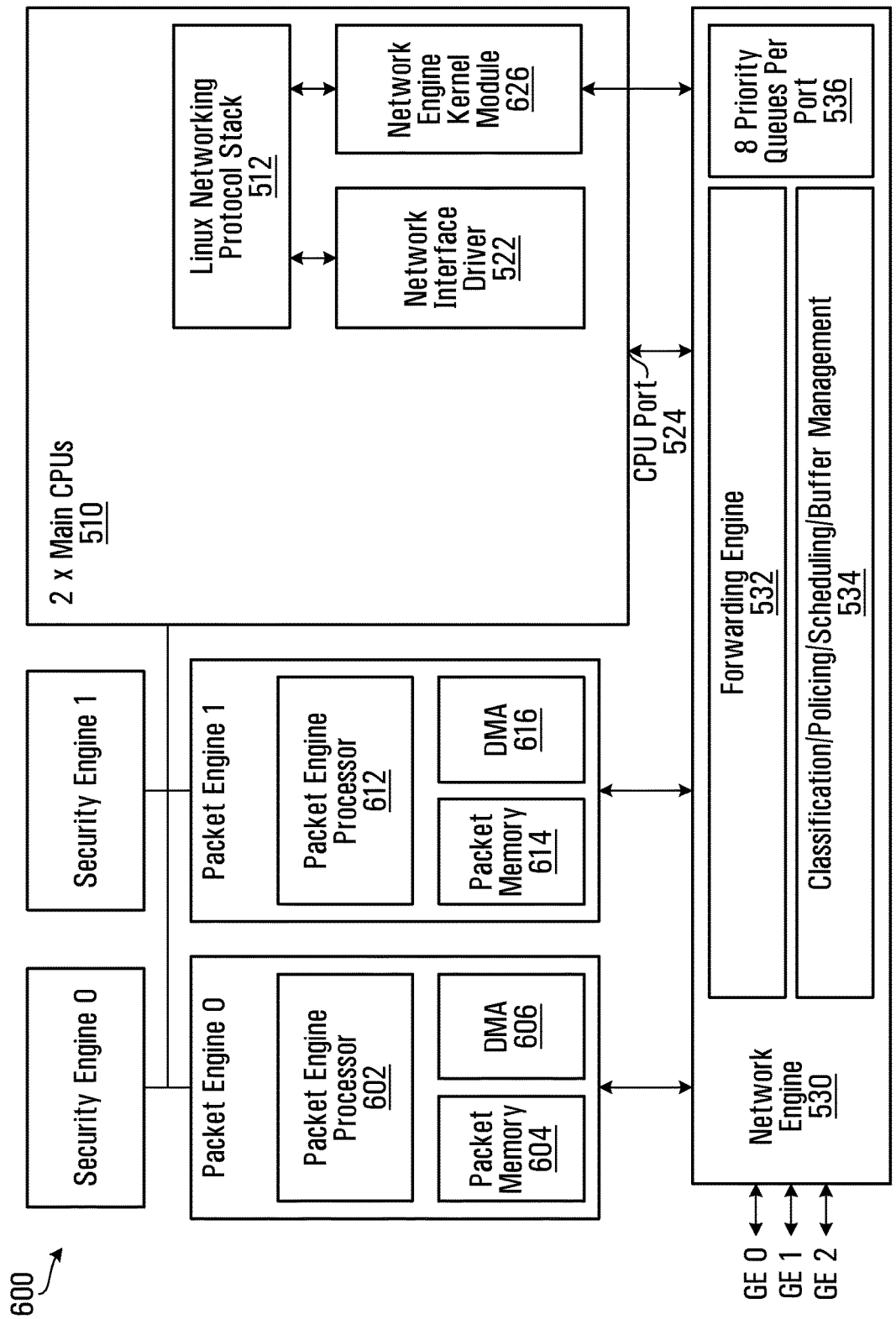

The example architecture 500 in FIG. 5 includes a 5 GHz IEEE 802.11ac WiFi module 502. Other embodiments may include other types of WiFi modules. An Ethernet Network Interface Card (NIC) 504 is also shown. Both of these modules are coupled to PCIe interfaces in this example. PCIe interfaces are not separately shown in FIG. 5, but are shown at 118, 120, 122 in FIGS. 1 and 2.

A dual main CPU architecture is shown in FIG. 5. In order to avoid congestion, the main CPUs are shown in a single block 510. Each main CPU 510 supports a Linux networking protocol stack 512, although other operating systems may be supported in other embodiments. A WiFi driver 514 includes lower layer driver 516 and an upper layer driver 518. An Ethernet driver is shown at 520, and the main CPUs 510 also execute a network interface driver 522. A CPU port 524 enables communications between the main CPUs 510 and the network engine 530.

The network engine 530 includes a forwarding engine 532, and other hard-coded functions of the network engine 530 are represented at 534. In the example architecture 500, there are 8 priority queues per port, shown at 536. One or more network interfaces in the network engine 530 enable communications over Ethernet connections shown as Gigabit Ethernet (GE) 0, GE 1, GE 2. These connections are through the GMAC interfaces 146, 148, 150 (FIG. 1) in an embodiment.

The example architecture 500 in FIG. 5 includes a hardware offload engine or accelerator in the form of the network engine 530. Further offload/acceleration hardware is shown in the example architecture 600 in FIG. 6. The security engine 0, security engine 1, packet engine 0, and packet engine 1 enable additional offloading and acceleration. The security engines handle security-related functions, and the packet engines handle data plane functions, as described herein. The security engines are hard-coded but configurable by system software running on the main CPUs 501, and the packet engines include respective packet engine processors 602, 612, packet memories 604, 614, and DMA controllers 606, 616.

The main CPUs 510, as noted above, support a Linux networking protocol stack 512, and provide a CPU port 524 for communicating with the network engine 530 and a network interface driver 522. The network engine kernel module 626 controls forwarding functions, and implements an interface between the Linux networking protocol stack 512 interface and the network engine hardware shown at 530. The network engine kernel module 626 also provides kernel hooks to enable the offload and flow management capability in the network engine 530, and controls and manages operation, configuration, and monitoring of the network engine.

Figure 7:
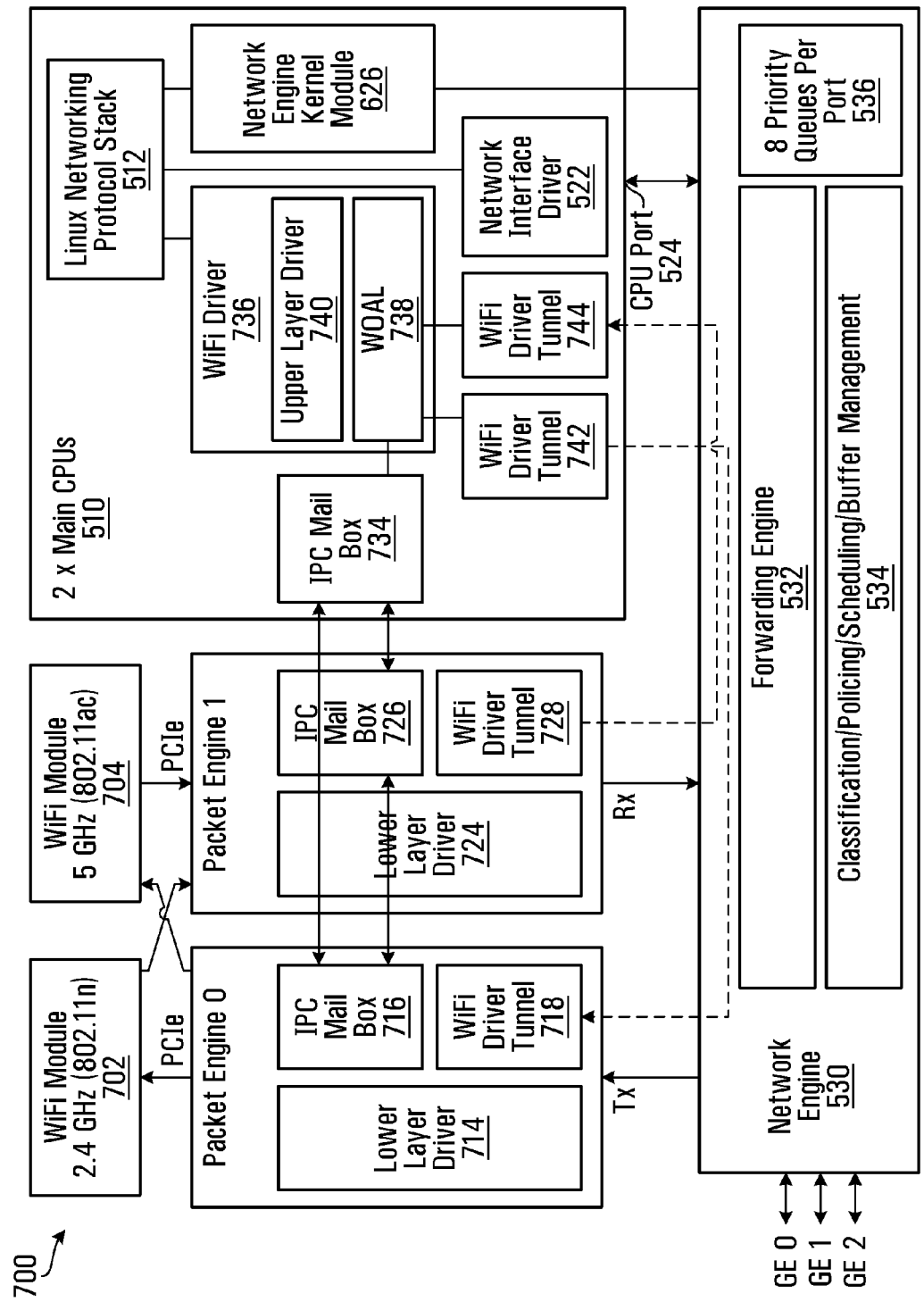

In the example architecture 700 (FIG. 7), there are two WiFi modules, including a 2.4 GHz IEEE 802.11n module 702 and a 5 GHz IEEE 802.11ac module 704, which connect to the packet engines through PCIe interfaces. The packet engine 0 and the packet engine 1 are represented in FIG. 7 primarily with functional blocks which illustrate the functions carried out by those engines in this embodiment. As shown, the packet engine 0 executes a lower layer WiFi transmit (Tx) driver 714, and the packet engine 1 executes a lower layer WiFi receive (Rx) driver. Each packet engine includes an Inter-Processor Communication (IPC) mail box 716, 726 which would be stored in memory, and a WiFi driver tunnel module 718, 728 for handling tunneling creation and termination, for example. One or more security modules could also be provided and used by the packet engines and/or the main CPUs 510, but are not shown in FIG. 7 in order to avoid congestion in the drawing.

The main CPUs 510 support the Linux networking protocol stack 512, and include the network interface driver 522 and the network engine kernel module 626. Each main CPU 510 also includes the CPU port 524 for communicating with the network engine 530, an IPC mail box 734, a WiFi driver 736 which includes an upper layer driver 740 and a WiFi Offload Adaptation Layer (WOAL) 738, and WiFi driver tunnel modules 742, 744.

The WiFi driver tunnels, provided by the WiFi driver tunnel modules 742, 744 at the main CPUs 510 and the packet engines, encapsulates 802.11 (WiFi) frames into 802.3 (Ethernet) frames which can be delivered to the main CPU via the network engine 530. In an embodiment, the network engine 530 is based on standard Ethernet and can understand and forward 802.3 frames. The frames sent and received via the WiFi modules 702, 704 could be in the form of 802.11 frames, which is very different from 802.3 frames.

The IPC mail box 734 operates in conjunction with the IPC mail boxes 716, 726 of the packet engines to provide an efficient communication mechanism between the main CPUs 510 and the packet engines. This is described in further detail below. The IPC mechanism between the main CPUs 510 and the packet engines is used for configuration, control and management functions in an embodiment. In the present example of WiFi offload, it is used to directly control and update the 802.11 frame to 802.3 frame conversion and vice versa, on a per-station basis. It could also used for the management such as diagnostics and performance monitoring.

A "station", in WiFi technology, refers to any client device connected to an access point (AP). Processor architectures as disclosed herein could be implemented in an AP such as a home gateway, for example. Station to station communication will typically go through the AP. For each station, the 802.11 frame header may be different, and in an embodiment the packet engines maintain a translation table for each station or for each destination MAC address.

Regarding the WiFi driver 736, a reason why main CPU utilization is high when handling WiFi user data frames, in FIG. 5 for example, is high context switch and long memory access latency. An objective of WiFi offloading as shown in FIG. 7 is to remove this "bottleneck" by relocating the user data traffic forwarding to the packet engines and the network engine 530. As a result, those data frames no longer go through the main CPU path. In the example offload design shown in FIG. 7, the packet engines handle the data interface and move the user data frames into and out of the WiFi modules 702, 704. Thus, the packet engines implement lower layer driver functions, as represented at 714, 724, and upper layer driver functions relating to protocol management and control remain in the WiFi driver 736 on the main CPUs 510, as shown at 740. The WOAL 738 enables this offloading, and is described in further detail below.

The network engine 530 continues to provide such features as forwarding, frame buffering, and QoS functions. The lower layer drivers 714, 724 are primarily involved in the data frame movement between the WiFi modules 702, 704 and the packet engines in the offload case (FIG. 7), or the main CPUs 510 in the non-offload case (FIG. 5). In addition, the lower layer drivers 714, 724 optionally process other data processing tasks such as 802.11 format conversion to 802.3 frame format for an Ethernet-based network engine 530, frame aggregation, rate control, and power savings. If frame conversion is provided, the packet engines maintain a conversion table for each station, since the 802.11 header information varies from one station to another. The table is dynamically updated via the IPC mail boxes 734, 726, 716 by the main CPUs 510, which are responsible for the association of each table with a station using control and management frames.

In operation, a WiFi module 702, 704 supports either of two user data frame formats across the PCIe or host interface, namely 802.11 frame format or 802.3 frame format. For illustrative purposes, consider an embodiment in which the Linux networking protocol stack 512 is configured to be in a bridging mode, in which frames are forwarded based on the destination MAC address.

The WiFi driver tunnels provided by the WiFi driver tunnel modules 718, 728, 742, 744 are an internal path to transmit frames between the packet engines and the upper layer driver 740 of the WiFi device driver 736 on the main CPUs 510. These tunnels are established as dedicated flows in the network engine 530 in an embodiment, and they have the capability to encapsulate 802.11 frames inside 802.3 frames, which can be recognized by the network engine. The encapsulation is provided by the WiFi driver tunnel modules 718, 728, 742, 744 in an embodiment. The WiFi driver tunnels 742 and 744 could be separate logical interfaces on the CPU port 524, each with 8 virtual priority queues. In this example implementation, the CPU port 524 supports 8 logical interfaces or 64 virtual priority queues. Each GE interface connected to the network engine 530 could also have 8 virtual priority queues on the network interface driver 522.

Considering receive (Rx) operation, when a management frame, identified by frame type, is received by the packet engine 1 from one of the WiFi modules 702, 704, the packet engine will send this frame directly to the main CPUs 510 through the WiFi driver tunnel between the WiFi driver tunnel modules 728, 744. The frame will be delivered to the upper layer driver 740 in a transparent fashion. The WOAL 738 enables offloading of data processing tasks, and provides an interface between the upper layer driver 740 and the lower layer drivers 714, 724, such that the offloading is transparent to the upper layer driver.

When a data frame, identified by a different frame type, is received by the packet engine 1 from one of the WiFi modules 702, 704, the lower layer driver 724 in the packet engine will first check a transmit or forwarding table to determine whether there is already an entry in the table for the destination MAC address. If it exists, this frame is not the first data frame in a data flow for the destination MAC address, and it will be delivered to the network engine 530 for forwarding and processing. If it does not exist, then it is the first data frame for the destination MAC address and it will be forwarded to the main CPUs 510 through the WiFi driver tunnel. The upper layer driver 740 will process the frame in the same way as the upper layer driver 518 in FIG. 5, including conversion of the frame format from 802.11 to 802.3. Then the frame is passed to the Linux networking protocol stack 512 where a forwarding decision will be made. This decision will provide the egress port to which the frame will be forwarded. The network engine kernel module 626 will create a flow entry in the network engine 530 for the source MAC address. The frame will be passed onto the network interface driver 522 which will in turn send it to the network engine 530 for forwarding.

Turning to transmit (Tx) operation, when a frame is received on one of the Ethernet interfaces in the network engine 530, and no flow entry match is found for its destination MAC address, it will be then forwarded to the network interface driver 522 on the main CPUs 510. The network interface driver 522 will pass the frame to the Linux networking protocol stack 512 for a forwarding decision. If the egress port for this frame is a WiFi interface, then the frame in 802.3 format will be passed on to the upper layer driver 740 in the WiFi device driver 736 for processing. A flow entry is then, or substantially simultaneously, created in the network engine 530 by the network engine kernel module 626 so that subsequent frames carrying the same destination MAC address will be directly forwarded from the network engine 530 to the packet engine 0 without involving the main CPUs 510, thereby providing the offload effect. The basic operation at the WiFi lower layer device driver 714 when a frame is forwarded to it directly by the network engine 530 is to convert the 802.3 frame into an 802.11 frame, among other processing functions. The frame will be sent to the packet engine 0 through the WiFi driver tunnel. Then, or substantially simultaneously, the WOAL 736 will send a configuration message to the packet engine 0 so an entry will be created in the transmit table indexed by the destination MAC address. This entry will allow the 802.3 frame carrying the destination MAC address to be converted to an 802.11 frame so it can be directly transmitted to the appropriate WiFi module 702, 704.

Figure 8:
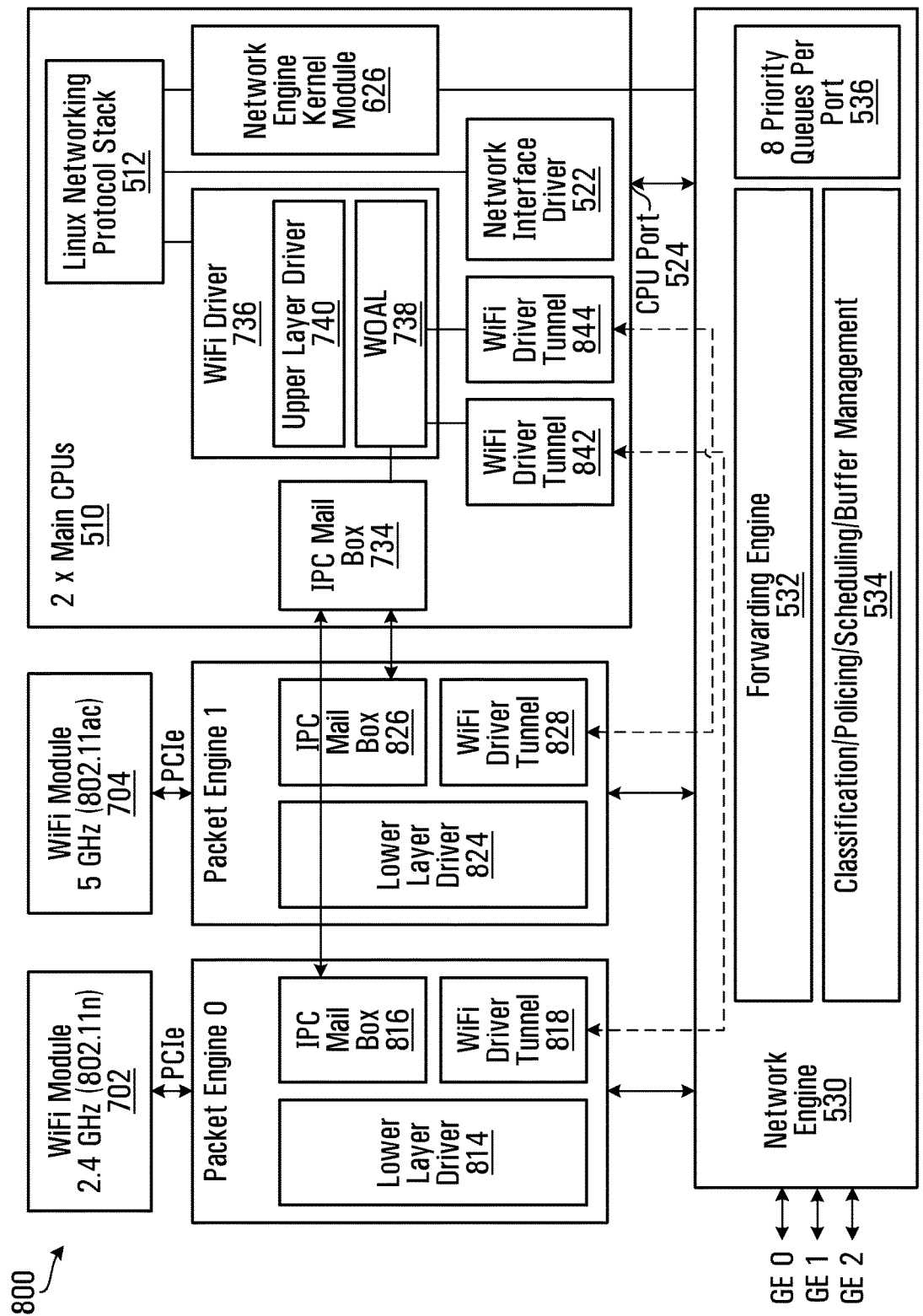

The example architecture 800 in FIG. 8 is substantially similar to the example architecture 700 in FIG. 7, except that both packet engine 0 and packet engine 1 handle transmit and receive operations. The lower layer drivers 814, 824, the IPC mail boxes 816, 826, and the WiFi driver tunnel modules 818, 828, 842, 844 thus support bidirectional communications. Interaction between the IPC mail boxes 816, 826 is also slightly different in the example architecture 800, in that the IPC mail boxes in this example need not interact with each other directly where each packet engine handles both transmit and receive operations. One difference between the example architectures 700 in FIGS. 7 and 800 in FIG. 8 is that the former allows load balancing if processing power requirements of the WiFi modules 702, 704 are asymmetric. However, it would be possible to interconnect both WiFi modules 702, 704 to both packet engines 0 and 1 in the example architecture 800 in FIG. 8 as well.

Figure 9:
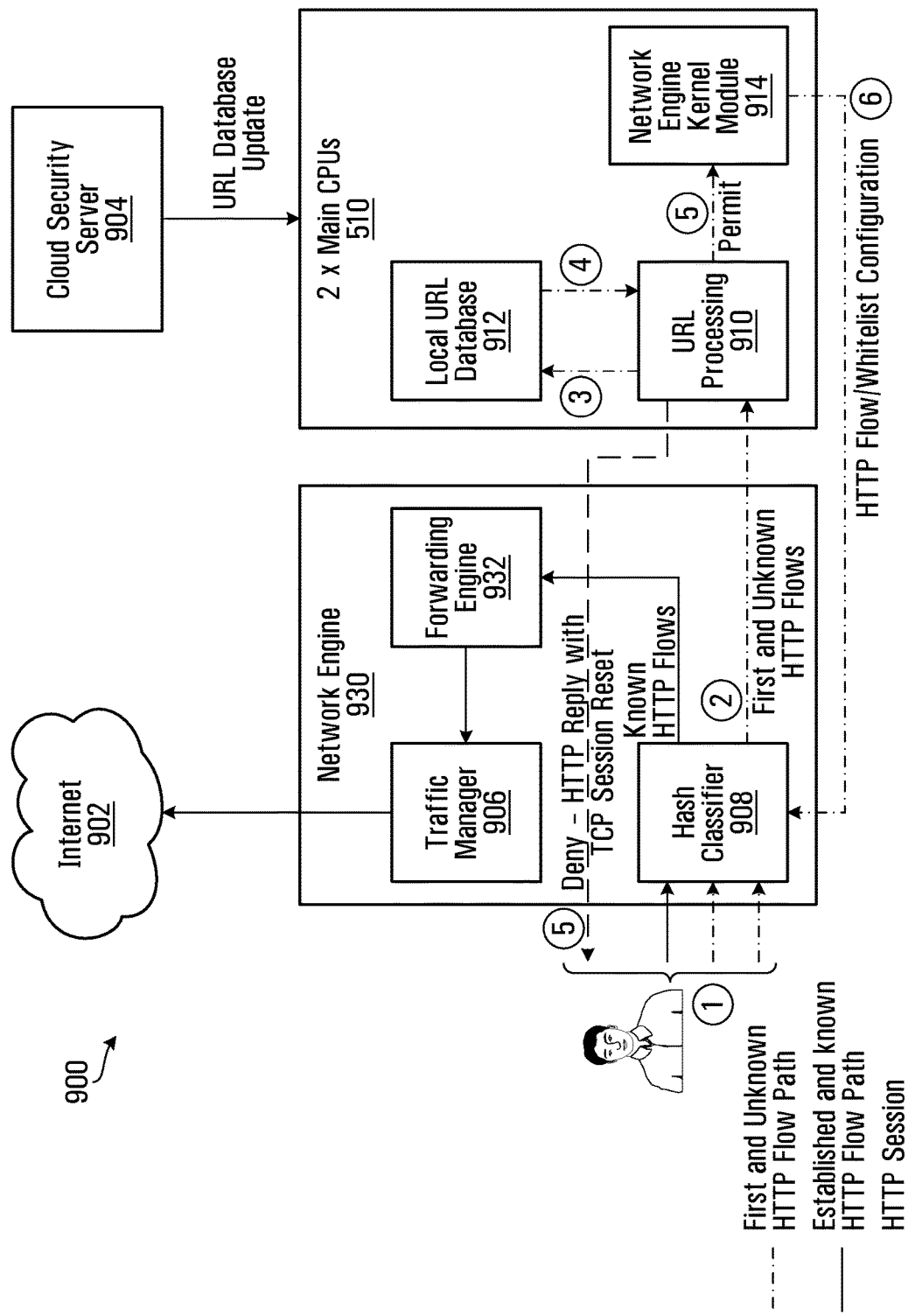

The example processing architecture 900 in FIG. 9 relates to web filtering. In this embodiment, data processing tasks related to web filtering are offloaded from the main CPUs 510 to the network engine 930, which includes a hash classifier 908, a traffic manager 906, and a forwarding engine 932, The network engine 930 could be implemented in substantially the same manner as in other embodiments, but is labeled differently in FIG. 9 to illustrate that it provides offloading of web filtering tasks, in addition to forwarding tasks in some embodiments. The network engine 930 communicates with the internet 902. Protocol management or control tasks remain on the main CPUs 510, and are shown in FIG. 9 as Uniform Resource Locator (URL) processing 910. The URL processing 910 is in the form of software executed by the main CPUs 510 in this example. The local URL database 912 stores filtering control information specifying how data traffic is to be filtered. In an embodiment, the local URL database 912 could store "white list" or permitted flow information specifying data traffic that is permitted, in which case non-permitted flows are to be dropped or otherwise filtered. The local URL database 912 is populated by URL database updates from a could security server 904 in the example shown. These updates could be on a daily basis, some other automatic schedule, and/or request-driven. A network engine kernel module 914 is also shown in FIG. 9.

The hash classifier 908, the forwarding engine 932, and the traffic manager 906 are hardware-based in an embodiment, and implemented in configurable but hard-coded hardware, for example. The hash classifier 908 identifies HTTP flows in the example processing architecture 900, based on a white list configuration by the network engine driver 914. If a HyperText Transfer Protocol (HTTP) flow (1) is not recognized by the hash classifier 908, which would be the case for a new packet in a flow, for example, the flow is forwarded (2) to the main CPUs for identification. As part of the URL processing at 910, the local URL database 912, and/or the could service security server 904 would be consulted (3), (4). If the flow is a permitted flow (5), then a hash table of the hash classifier 908 is configured (6) for the permitted flow by the network engine kernel module 914, or the URL processing 910 sends (5—Deny) an HTTP reply with TCP session reset for a denied flow, or alternatively, a URL redirect message (not shown in the figure). This HTTP reply or redirect is returned to the requesting user system through the network engine 930.

A flow that is recognized by the hash classifier 908 is handled by the network engine 930 without involvement by the main CPUs 510, thereby offloading data processing, after the initial identification, from the main CPUs.

The WiFi and web filtering examples in FIGS. 5 to 9 illustrate a form of first packet processing that enables offloading of substantial data processing tasks from the main CPUs 510. Although the main CPUs 510 are involved when a flow is not recognized by an offload engine, data processing for a flow after it has been initially identified software executing on the main CPUs 510 can be offloaded. Management or control tasks remain on the main CPUs 510, and data processing tasks are offloaded to offload engines. In the WiFi examples of FIGS. 7 and 8, the main CPUs 510 still handle upper layer WiFi protocol management or control tasks, and thus the offloading does not change how the protocol operates or require any changes in the WiFi modules 702, 704. Similarly, in the web filtering example in FIG. 9, the URL processing 910 resides on the main CPUs 510, and offloading of filtering to the hash classifier 908 in the network engine 930 does not affect HTTP and TCP operation. Protocol management or control tasks for HTTP and TCP are handled by the main CPUs 510, and data processing is offloaded to the network engine 930.

Software Partitioning/Splitting

Processing architectures as disclosed herein enable tasks to be offloaded from one or more main CPUs to one or more offload or acceleration engines. For example, software such as peripheral device drivers might involve protocol management or control tasks and data processing tasks. In an embodiment, management or control tasks remain on the main CPU(s) so that offloading does not change the way in which protocols or interface devices such as WiFi modules operate, and lower layer data processing tasks are offloaded. Such software partitioning or splitting entails identifying which pieces of software or which tasks make sense to relocate to an offload engine and which pieces or tasks should reside on the main CPU(s). In an embodiment, pieces of the software drivers that handle the most data traffic and therefore are least efficient on a general purpose application processor could be rewritten, revised, or otherwise ported to an offload engine and carved out of the software that will remain for execution by the main CPU(s).

Figure 10:
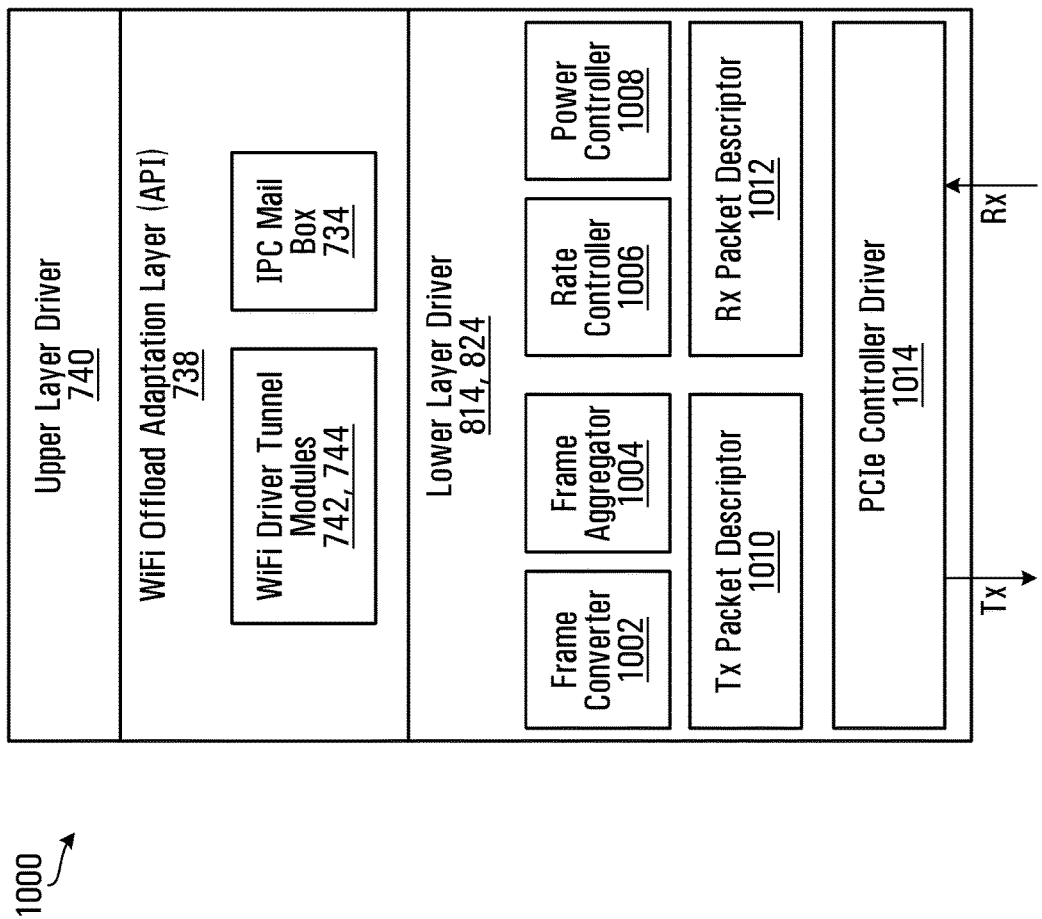
FIG. 10 illustrates an example of a partitioned device driver.

FIG. 10 illustrates an example of a partitioned device driver. The example partitioned device driver 1000 relates to WiFi device driver partitioning as shown in FIG. 7, in which the upper layer driver 740 remains on the main CPUs 510 and lower layer drivers 814, 824 are offloaded to the packet engines. This offloading is enabled by the WOAL 738. The WiFi driver tunnel modules 742, 744 and the IPC mail box 734 are shown separately from the WOAL 738 in FIG. 7, but are shown as part of the WOAL in FIG. 10 since the WOAL interacts with these components to provide an adaptation layer or interface between the lower layer drivers 814, 824 and the upper layer driver 740. In the example 1000, the WOAL 738 is an Application Programming Interface (API). A purpose of this API is to allow the separation of the lower layer driver and the upper layer driver so that changes in either of them will have little or no impact on the other.

In an embodiment, the upper layer driver 740 performs 802.11 protocol management tasks and provides a device driver interface to the Linux networking stack 512 (FIGS. 7, 8), and the lower layer drivers 814, 824 handle actual data movement to and from peripheral devices, namely WiFi modules 702, 704 (FIGS. 7, 8), through PCIe interfaces and the PCIe controller driver 914 in the example shown. Tasks such as 802.11/802.3 frame conversion by the frame converter at 1002, frame aggregation by the frame aggregator at 1004, rate control by the rate controller at 1006, and power management for power saving features by the power controller at 1008, are offloaded in the lower layer drivers 814, 824 in this example.

The movement of data between the WiFi modules 702, 704 and the lower layer drivers 714, 724, 814, 824 is performed by a DMA operation through a packet ring structure in an embodiment. The packet ring structure contains packet descriptors which describe the packets stored in a packet memory with a read pointer and a write pointer. Each packet descriptor 1010, 1012 has packet information such as the memory location for the packet and packet length. When a packet is ready to be transmitted from a WiFi module 702, 704 to a packet engine, an interrupt signal is sent to the packet engine. The packet engine then initiates the transmission from the read pointer in the receive packet ring. There is a similar packet ring for the transmission from the packet engine to a WiFi module 702, 704.

Between the upper layer driver 740 and lower layer drivers 814, 824, the WOAL 738 provides a "shim" or interface layer to enable the offload capability in a manner that is transparent to the upper layer driver. The WOAL 738 controls and communicates with offload engines, namely packet engines in this example, via the IPC mail box 734, and also provides the WiFi driver tunnel for transparent data delivery. The lower layer drivers 814, 824 can be rewritten or otherwise revised for compatibility with the offload API provided by the WOAL 738, which in turn interfaces with the upper layer driver 740. Offloading could be entirely transparent to the upper layer driver 740 by having the WOAL 738 provide an interface to the upper layer driver that is consistent with an interface definition or specification through which routines or functions that are to remain on the main CPUs 510 (FIGS. 7, 8) interact with routines or functions that are to be offloaded. For instance, the WOAL 738 could be adapted to accept function or routine calls from the upper layer driver 740 in the driver "native" formats, and to return results to the upper layer driver in native formats as well. Translation between the native format and other format(s) used to implement the offloaded tasks or functions can then be handled by the WOAL 738. The WiFi driver tunnel modules 742, 744 represent an example of this type of feature, which allows WiFi frames to be transported between packet engines and the main CPUs 510 through the network engine 530 (FIG. 7).

FIG. 10 relates to WiFi device driver software splitting or partitioning for offloading functions from one or more main CPUs to offload processor(s) and/or other hardware. A similar software split or partition could be used in the example processing architecture 800 in FIG. 8. Drivers for other types of devices and/or even other types of software could be split or partitioned in other embodiments, to offload certain tasks.

For instance, in the example processing architecture 900 in FIG. 9, web filtering software is split between the main CPUs 510 and the network engine 930. URL processing, which handles protocol management or control tasks, remains on the main CPUs. Data processing tasks, in this case filtering, are offloaded to the network engine 930.

Considering software splitting more generally, one objective of offloading tasks from main CPUs might be to relocate tasks that are not efficient on general-purpose processors to less powerful but specially configured processors or other offload hardware. This type of approach could be driven by main CPU processing bottlenecks and/or high main CPU utilization, for example.

In developing an offload strategy, it could also be desirable not to change protocols, as doing so would create additional processing load and/or changes in devices that connect to a processing architecture. Considering the WiFi offload as an example, it might be possible to change WiFi modules 702, 704 (FIGS. 7, 8) so that some tasks are performed at the "front end" before data arrives on a PCIe interface. This approach, however, significantly impacts WiFi device design. Traditionally, WiFi devices are not intelligent, in that processing intelligence resides elsewhere in a processing system. Relocating that intelligence onto WiFi devices themselves requires a significant shift in device design and also significantly impacts WiFi protocols.

Analysis of device driver software and/or other types of software could be undertaken in an embodiment to identify lower layer (e.g., layer 1 or layer 2) data processing bottlenecks, which involve data processing at only a single layer in an embodiment. Protocol management or control tasks tend to be less processor-intensive, and are generally performed less often, than data processing tasks, and therefore protocol management or control tasks could be good candidates to remain on main CPUs. Once data processing tasks are identified for offloading, software for performing those tasks can be rewritten or otherwise revised to run on offload hardware. In some embodiments, such tasks could be hard-coded into hardware which mimics the software tasks. Hard coding of offload tasks can provide further benefits in terms of speed.

Device drivers, for example, might perform specific tasks on specific types of data. Thus, for a certain type or pattern of input, generally called a "flow" herein, a certain task or set of tasks would always be performed. This type of action could be soft- or hard-coded into an offload engine. In an embodiment, the first packet for a new data flow is provided to main CPUs for identification based on header processing or other protocol management processing. Software executing on the main CPU can then update offload engine tables or otherwise provide identification information to an offload engine, which can then identify other packets in the same flow and perform the same data processing tasks without involving the main CPUs. Such "first-packet" processing by the main CPUs in this example provides for centralized protocol management processing, while still enabling data processing tasks to be offloaded. The first packet may be extended in an embodiment to include multiple packets until a flow for offloading can be identified on the main CPUs.

Memory Subsystem

Splitting or partitioning software functionality incurs communication overhead between the main CPU(s) and offload processor(s). Cache coherency hardware is provided in some embodiments and allows transactions that go across the system bus between processors to be coherent from the perspective of each processor's memory subsystem. This reduces the amount of overhead spent locking and unlocking resources and therefore allows the processors to communicate more quickly. Cache coherency implementations could be provided for homogenous main CPU/offload processor architectures (i.e., the main CPU(s) and the offload processor(s) are of the same type) or heterogeneous processor architectures.

Cache coherency allows main CPUs to communicate with offload engines using memories and caches without incurring the overhead of having to wait for message passing mechanisms such as spin locks or mailboxes. This results in fewer wasted main CPU clock cycles and therefore minimizes power dissipation and maximizes performance.

In an embodiment, cache coherency is implemented by giving offload engines access to main CPU L1 and L2 caches, through a processor cache coherency port. When the offload engines are configured to use cache coherent accesses, they read from and write to DDR or SRAM memory locations by going through the main processor L1 or L2 caches.

For example, a main CPU might pass an offload engine a memory pointer which indicates the location of a stored packet. In a non-cache coherent configuration, the offload engine would then read the packet directly from memory and process it. Then it would write the packet back to memory, which can take a long time due to the slow speed of memory relative to the speed of on-chip processors. If the main CPU tried to read the same packet data during the time while the offload engine is working, then it would get incorrect data. To avoid this, the main CPU must instead use software cycles to poll or otherwise wait for the offload engine to indicate completion of the writes to memory, and then proceed to read the packet data back from memory.

In a system with coherence enabled, the offload engine would read the packet through the L1/L2 cache structure of the main CPU. This would cause the main CPU to read the packet data from memory and expose the packet data to its cache. When the offload engine is done modifying the packet data, it writes it back to the L1/L2 cache structure of the main CPU. This allows the CPU to immediately have access to the modified data without waiting for it to be written back to memory.

Processing architectures as disclosed herein could work in a cache coherent mode or a non-cache coherent mode. For non-cache coherent mode, IPC mail boxes could be provided to facilitate the communication between the offload engine(s) and the main CPU(s). Mail boxes, such as those shown in FIGS. 7 and 8, allow for reliable message passing with relatively low CPU overhead. When an offload engine has completed a task it can place a message indicating completion into the mailbox for the main CPU(s). In an embodiment, this will cause an interrupt to be generated to the main CPU(s). The main CPU(s), as part of an interrupt handling routine, can then read the message and be notified of task completion. This keeps the main CPU(s) and the offload engine(s) in synchronization with each other.

Flexible I/O

In an embodiment, a flexible and dynamically controllable interconnect, such as shown at 272 in FIG. 2, enables any processor or offload/acceleration engine in the a processing system to control any resource in the system. This allows software to allocate which processors or hardware will control which I/Os at run time. For example, offload processors could take control of high bandwidth SERDES I/Os such as PCIe when it makes sense to do so, such as when a particular PCIe interface is connected to a WiFi module and data processing tasks for WiFi are to be offloaded.

Figure 11:
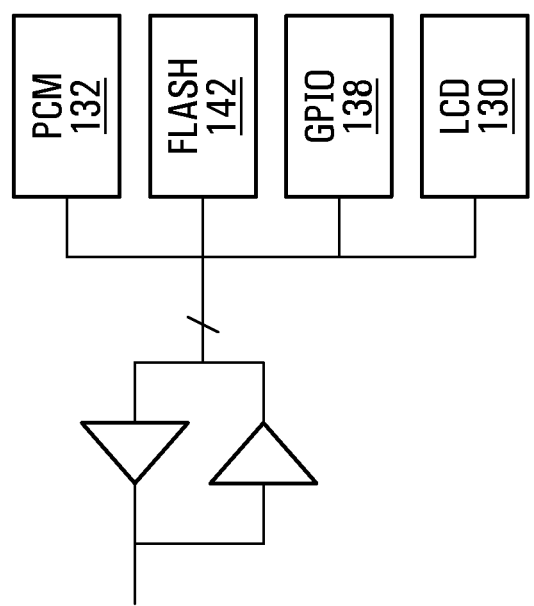
FIG. 11 is a block diagram illustrating low-speed interfaces.

Some embodiments might also or instead provide for multiplexing of interfaces over the same pin(s) or port(s). This type of flexibility in I/O is shown by way of example in FIG. 11, which is a block diagram illustrating low-speed interfaces. As shown in FIG. 11, low-speed interfaces such as the PCM interface 132, the Flash interface 142, and the LCD interface 130, may be multiplexed with GPIO functions for the GPIO interface 138. This allows software to dynamically allocate I/O pins to functions.

Figure 12:
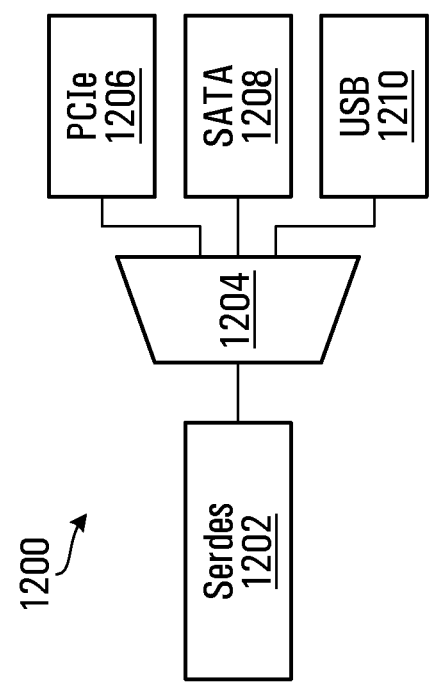
FIG. 12 is a block diagram illustrating high-speed interfaces.

FIG. 12 is a block diagram illustrating high-speed interfaces and a similarly multiplexing feature. The example interface arrangement 1200 shows SerDes based flexible I/Os. As shown in FIG. 1 at 118, 120, 122, PCIe and SATA interfaces can be shared on the same I/O even though they are two different protocols. This could be implemented in an interface arrangement 1200, including a SerDes 1202, a multiplexer 1204, and PCIe and SATA interfaces 1206, 1208. System software can determine whether the SerDes I/O should act as a PCIe or a SATA interface while the chip is running, and then configure it to that protocol. Other high-speed interfaces could be multiplexed in a similar manner, and a USB interface 1210 is shown in FIG. 12 as an example of one such interface.

Example Applications

Processing architectures as disclosed herein could be implemented in any of various applications.

In a service provider video gateway, for example, the PCIe integrated interfaces 118, 120, 122 (FIG. 1) could be used to provide two independent WiFi connections and additional high speed multi-channel transcoding/decoding to facilitate a full video solution. One of the USB ports 126, 128 could be used for access to the processing architecture, leaving the other available for host or device user connectivity for printers and disk attached storage in an embodiment. The integrated SATA port 124, and/or one or more PCIe/SATA interfaces 118, 120, 122 could be used in this type of application for Personal Video Recorder (PVR) and/or Network Attached Storage (NAS) functionality.

Scalable interfaces and performance in a processor architecture could support wide range of cost and performance media server models. The example architecture 100 in FIG. 1 supports up to four SATA ports at 118, 120, 122, 124, for example, any or all of which could be used to implement a wide range of NAS solutions. The LCD interface 130 directly supports picture frame functionality in an embodiment, and could also connect to a panel through a High Definition Multimedia Interface (HDMI) converter, for example, to provide for medium-resolution display output at low cost.

In implementing a router/VPN concentrator, one of the dual USB ports 126, 128 could be configured in device mode to allow USB storage and other USB device connectivity. Under the USB device mode, the USB port is seen as a USB mass storage device by a PC or other connected systems. SATA ports at 118, 120, 122, 124 could also be used for external storage. VPN applications would also utilize the encryption capabilities provided by the security engine 160.

The example architecture 100 could also be useful to provide a low-cost solution for security premises equipment through its 3 PCIe interfaces 118, 120, 122 for high-camera-count video converters. The onboard encryption capability in the security engine 160 allows secure storage of encoded video. The processing power of the main CPUs 102, 104 could support multiple camera transcoding without additional hardware support. If a video capture device supports coding, then the example architecture 100 could provide just encryption and decryption of the storage data by the security engine 160.

Figure 13:
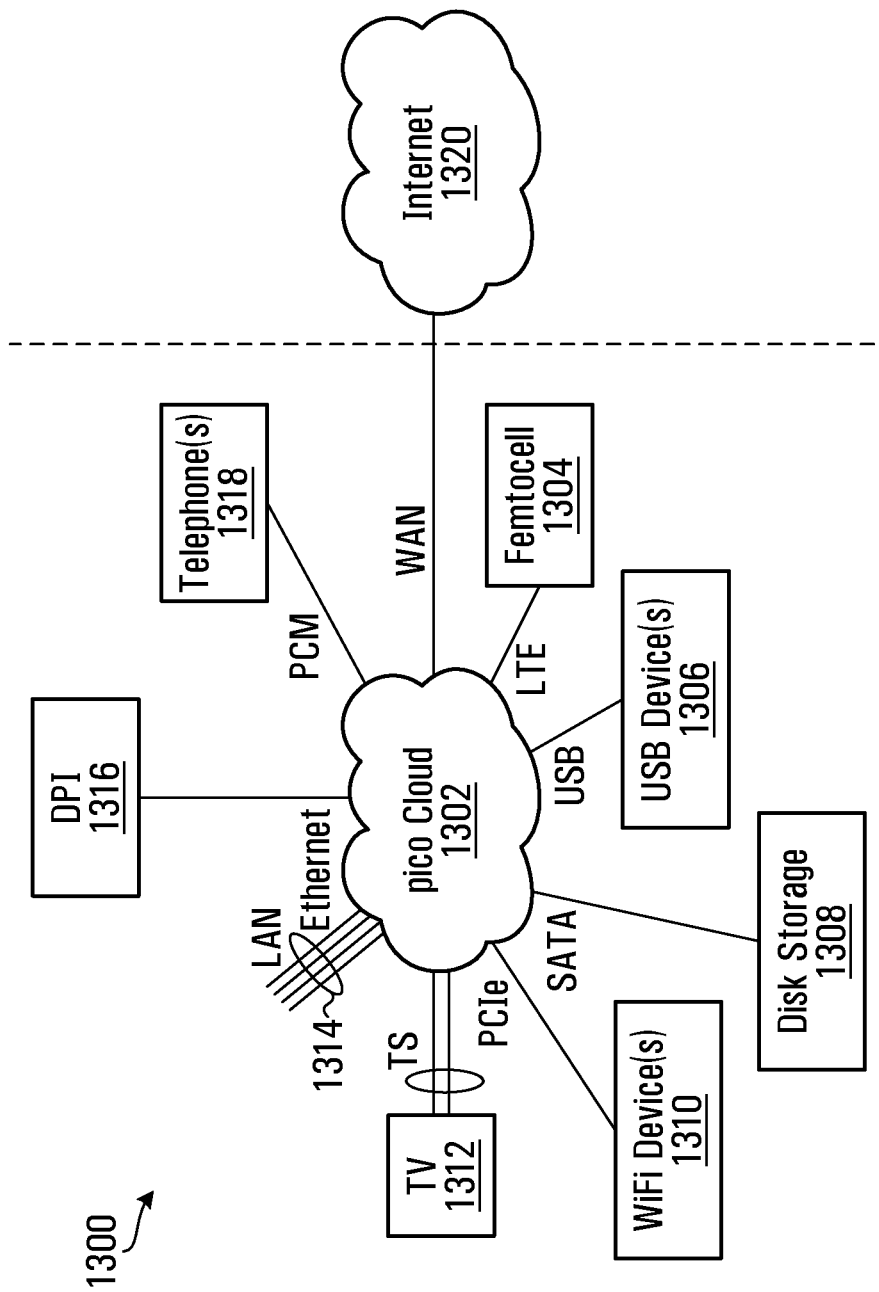
FIG. 13 is a block diagram illustrating an example multi-service system.

FIG. 13 is a block diagram illustrating an example multi-service system. The example multi-service system 1300 includes a pico cloud 1302, which could represent home or small to medium enterprise (SME) equipment. A processing architecture as disclosed herein could be implemented in the pico cloud 1302 to support any or all of the various services shown in FIG. 13. A femtocell 1304 could be provided over a Long Term Evolution (LTE) wireless connection, for example. One or more USB devices 1306 connect to the pico cloud 1302 through USB connections. NAT services could be enabled through one or more SATA connections and disk storage 1308. One or more WiFi devices at 1310 could connect to the pico cloud 1302 through PCIe connections as discussed in detail above. TV services at 1312 are enabled through one or more Transport Stream (TS) connections. In the example multi-service system 1300, LAN services 1314 could be provided through one or more Ethernet connections. At 1316, a Deep Packet Inspection (DPI) module could be provided, for home security purposes, for example. The DPI module 1316 can be a separate hardware module which can be connected to a network engine in a processing architecture in the pico cloud 1302. Telephone services could be supported over one or more PCM connections as shown at 1318, and a WAN connection to the internet 1320 could also be provided.

Regarding the DPI module 1316, instead of just looking at L2, L3 or L4 headers to decide whether to admit/drop/route a packet, this module could look very deeply into, for example, L7 content of the packet and then decide what to do. The DPI module 1316 could employ "rules" which specify what to look for and what action to take, and could be used, for example, to look into packets and find viruses. Infected packets could then be identified and dropped. This could be of interest in cloud environments to prevent malicious activity before entry into the cloud network at any "edge".

Figure 14:
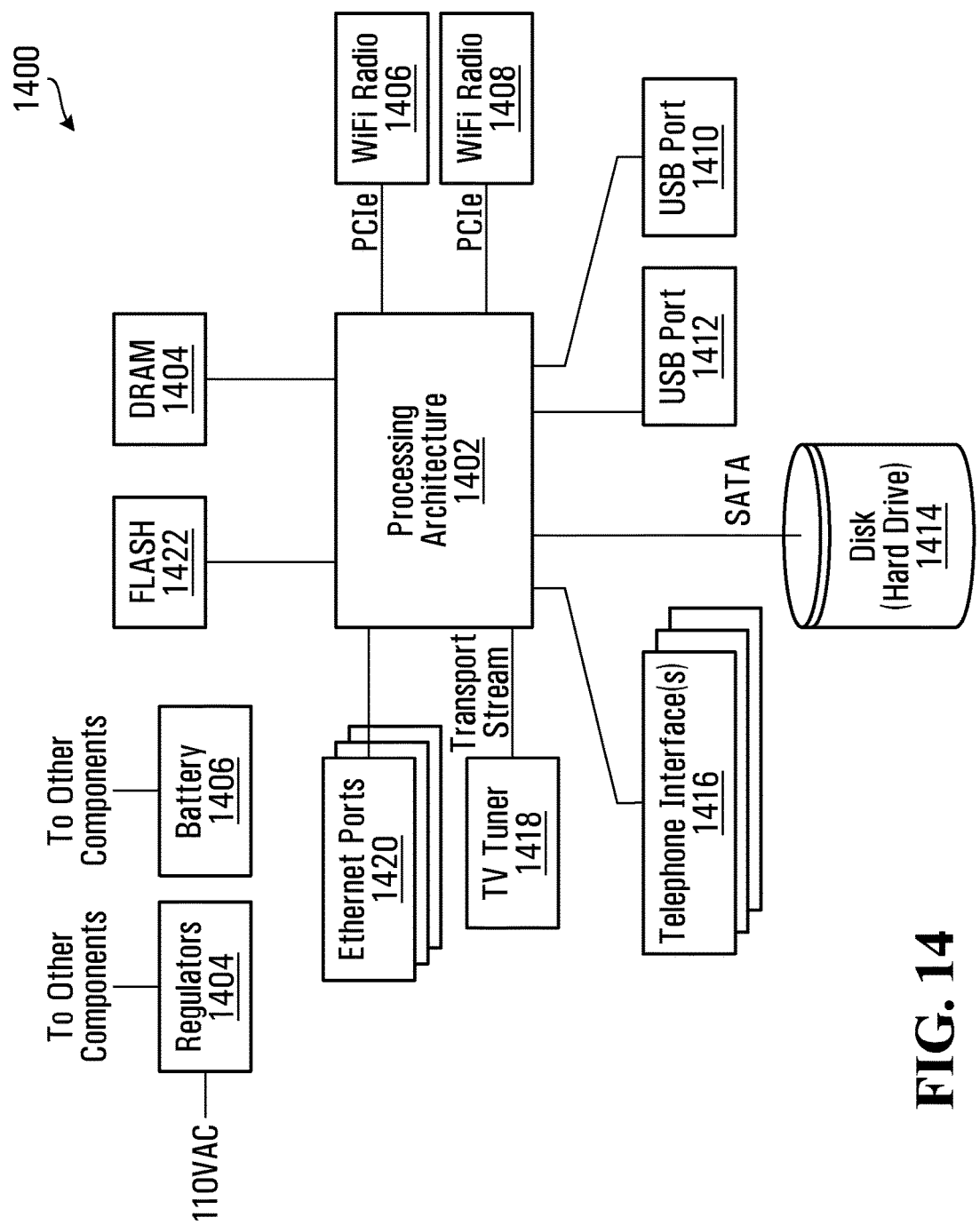
FIG. 14 is a block diagram illustrating an example gateway.

In an embodiment, the pico cloud 1302 is provided by a gateway which includes a processing architecture and multiple interfaces. FIG. 14 is a block diagram illustrating an example gateway.

The example gateway 1400 includes powering components such as the regulators 1404, coupled to a 110V supply in this example, and a battery 1406. The battery 1406 could be implemented to provide for "life line" protection for telephones that require power to operate, for example. If the example gateway 1400 is used for home phone service, then the battery 1406 could maintain telephone service, at least temporarily, in the event of a power failure.

A processing architecture 1402, in accordance with teachings provided herein, is coupled through its various interfaces to memory in the form of DRAM 1404 and flash memory 1422 in this example. WiFi radios 1406, 1408 connect to the processing architecture 1402 through integrated PCIe interfaces. USB ports are shown at 1410, 1412 for connection to external USB devices. A gateway might also include disk storage such as a hard drive 1414, connected to a SATA interface of the processing architecture 1402. Telephone interfaces 1416, such as phone jacks, could connect to one or more integrated PCM interfaces, and/or other interfaces in the case of Voice over IP (VoIP) phones for example, in the processing architecture 1402.

A video enabled gateway could include one or more TV tuners 1418 connected to transport stream interfaces in the processing architecture 1402. Ethernet ports are shown at 1420, and could be used to provide internet connectivity, for one or more standalone computers and/or networked computers.

What has been described is merely illustrative of the application of principles of embodiments of the invention. Other arrangements and methods can be implemented by those skilled in the art without departing from the scope of the present invention.

For example, the drawings are intended solely for illustrative purposes. Other embodiments may include additional, fewer, and/or additional components, interconnected in similar or different arrangements. Each of the main CPUs 102, 104 (FIG. 1) could include a Digital Signal Processor (DSP) with its own data cache and instruction cache, for instance. In an embodiment, these caches are each 32 kB, although different numbers and/or sizes of caches are also contemplated.

In addition, although described primarily in the context of methods and systems, other implementations of the invention are also contemplated, as instructions stored on a computer-readable medium, for example.

Features herein in singular or plural form are not intended to limit embodiments to any number of instances or components. For example, the processing architectures disclosed herein need not be implemented in conjunction with multiple main CPUs.

It is also noted that packets are an illustrative and non-limiting example of blocks of data that could be processed as disclosed herein. Cells, frames, and/or other data blocks could be handled in the same or a similar manner as packets.

We claim:

1. An integrated processing system comprising, in an integrated circuit package:
   a main processor to perform protocol management tasks associated with management or control packets in a packet-based protocol according to which data packets are received from an external component outside the integrated processing system;
   an offload subsystem to perform data processing tasks for data packets received according to the packet-based protocol;
   an interface to enable communication with the external component; and
   an interconnect coupled to the main processor, to the offload subsystem, and to the interface, the interconnect enabling both the main processor and the offload subsystem to communicate with the external component through the interface.

2. The integrated processing system of claim 1, the offload subsystem comprising a network engine to execute data forwarding tasks.

3. The integrated processing system of claim 2, the network engine being configured to determine whether a received data packet is associated with a known data flow, to forward the received data packet to a destination where the received data packet is associated with a known data flow, and to forward the received data packet to the main processor for flow identification where the received data packet is not associated with a known data flow, the main processor being configured to identify a data flow with which the received data packet is associated where the received data packet is forwarded to the main processor by the network engine, and to configure the identified data flow as a known data flow in the network engine.

4. The integrated processing system of claim 3, the network engine being configured to determine whether the received data packet is associated with a known data flow by determining whether the received data packet is associated with a data flow previously configured in the network engine by the main processor.

5. The integrated processing system of claim 3, the main processor being operable to configure the identified data flow in the network engine by configuring the identified data flow in a flow table stored in memory.

6. The integrated processing system of claim 3, a data flow comprising one or more of: data packets of a particular type; data packets associated with a source; data packets associated with a destination.

7. The integrated processing system of claim 1, the offload subsystem comprising a security engine to perform security-related tasks for received data packets.

8. The integrated processing system of claim 7, the security engine comprising a configurable hard-coded encryption core.

9. The integrated processing system of claim 1, the offload subsystem comprising a packet engine.

10. The integrated processing system of claim 9, the packet engine comprising a further processor executing packet engine software.

11. The integrated processing system of claim 10, the main processor being of a first processor type and the further processor being of a second processor type different from the first processor type.

12. The integrated processing system of claim 1, the main processor allowing the offload subsystem to access a main processor memory cache through the interconnect.

13. The integrated processing system of claim 1, further comprising: a memory, coupled to the interconnect, to store respective mail boxes associated with and readable by the main processor and the offload subsystem, the interconnect enabling the main processor to write messages into the mail box associated with the offload subsystem and enabling the offload subsystem to write messages into the mail box associated with the main processor.

14. The integrated processing system of claim 1, the external component comprising an external component controllable through a software driver, the main processor executing a first portion of the software driver, and the offload hardware executing a second portion of the software driver.

15. The integrated processing system of claim 1, the interface comprising a configurable interface, the configurable interface comprising a configurable component that is configurable for operation in conjunction with any of a plurality of different physical interfaces.

16. The integrated processing system of claim 15, the configurable component comprising a serializer/deserializer (SerDes) that is configurable by the main processor.

17. The integrated processing system of claim 16, the plurality of different physical interfaces comprising Peripheral Component Interconnect express (PCIe) interfaces, Serial Advanced Technology Attachment (SATA) interfaces, and Universal Serial Bus (USB) interfaces.

18. A method comprising:
   providing, in an integrated circuit package, a main processor to perform protocol management tasks associated with management or control packets in a packet-based protocol according to which data packets are received from an external component outside the integrated processing system;

providing, in the integrated circuit package, an offload subsystem to perform data processing tasks for data packets received according to the packet-based protocol;

providing, in the integrated circuit package, an interface to enable communication with the external component; and providing, in the integrated circuit package, an interconnect coupled to the main processor, to the offload subsystem, and to the interface, the interconnect enabling both the main processor and the offload subsystem to communicate with the external component through the interface.

19. A method comprising:

performing, by a main processor in an integrated circuit package, protocol management tasks associated with management or control packets in a packet-based protocol according to which data packets are received from an external component outside the integrated circuit package;

performing, by an offload subsystem in the integrated circuit package, data processing tasks for data packets received according to the packet-based protocol;

controlling, by both the main processor and the offload subsystem, the external component.

20. The method of claim 19, the data processing tasks comprising one or more tasks to be performed for a particular type of data packet, the method further comprising:

determining, by the offload subsystem, whether received data packet is the particular type of data packet;

performing the one or more tasks, by the offload subsystem, where the received data packet is determined to be the particular type of data packet;

forwarding the received data packet from the offload subsystem to the main processor for data packet type identification where a data packet type of the received data packet is not determined by the offload subsystem;

identifying, by the main processor, a data packet type of the received data packet where the received data packet is forwarded to the main processor;

configuring the identified data packet type in the offload subsystem.

21. The method of claim 19, further comprising: configuring configurable hard-coded hardware in the offload subsystem to perform the data processing tasks.

22. The method of claim 19, further comprising: allowing the offload subsystem to access a main processor memory cache.

23. The method of claim 19, the external component comprising an external component controllable through a software driver, the performing by the main processor comprising executing a first portion of the software driver, the performing by the offload subsystem comprising performing tasks associated with a second portion of the software driver.

24. A processing architecture comprising, in an integrated circuit package:

a main processor to perform protocol management tasks associated with management or control packets in a Wireless Fidelity (WiFi) protocol according to which data packets is received from a WiFi device outside the integrated processing system;

an offload subsystem to perform data processing tasks for data packets received according to the WiFi protocol;

an interface to enable communication with the WiFi device; and an interconnect coupled to the main processor, to the offload subsystem, and to the interface.

25. The processing architecture of claim 24, further comprising: a network engine coupled to the interconnect, to perform forwarding of Ethernet packets, the main processor and the offload subsystem each comprising a WiFi driver tunnel module to encapsulate WiFi packets into Ethernet packets for exchange between the main processor and the offload subsystem through the network engine.

26. The processing architecture of claim 24, the main processor being configured to execute upper layer WiFi driver software, the offload subsystem being configured to execute lower layer WiFi driver software, the lower layer WiFi driver software causing the offload subsystem to forward a first received WiFi data packet of an unknown flow to the main processor for flow identification and to process subsequent packets from the flow after identification of the flow by the main processor.

27. The processing architecture of claim 24, the interface comprising a Peripheral Component Interconnect express (PCIe) interface.

28. A method comprising:

identifying, in driver software for a peripheral device, protocol management tasks associated with management or control packets in a packet-based protocol according to which the peripheral device operates;

separating a portion of the driver software comprising the protocol management tasks from a remainder of the driver software;

providing an implementation of the remainder of the driver software;

providing a software adaptation layer comprising an upper layer interface consistent with an interface between the portion of the driver software and the remainder of the driver software and a lower layer interface consistent with the implementation of the remainder of the driver software, to enable the portion of the driver software to execute on different hardware from the implementation of the remainder of the driver software.

29. An integrated processing system comprising:

a main processor to perform protocol management tasks associated with a protocol according to which data is received from an external component outside the integrated processing system; and an offload subsystem, coupled to the main processor, to perform data processing tasks for data received according to the protocol and associated with known data flows, the offload subsystem being configured to determine whether received data is associated with a known data flow, to perform the data processing tasks for the received data where the received data is associated with a known data flow, and to forward the received data to the main processor for flow identification where the received data is not associated with a known data flow, the main processor being configured to identify a data flow with which the received data is associated where the received data is forwarded to the main processor by the offload subsystem, and to configure the identified data flow as a known data flow in the offload subsystem.

30. A method comprising:

performing, by a main processor in an integrated processing system, protocol management tasks associated with a protocol according to which data is received from an external component outside the integrated circuit package;

determining, by an offload subsystem coupled to the main processor in the integrated processing system, whether data received according to the protocol is associated with a known data flow configured in the offload subsystem;

performing, by the offload subsystem, data processing tasks for the received data where the received data is associated with a known data flow;

forwarding the received data from the offload subsystem to the main processor for data flow identification where the received data is not associated with a known data flow;

identifying, by the main processor, a data flow with which the received data is associated where the received data is forwarded to the main processor; configuring, by the main processor, the identified data flow as a known data flow in the offload subsystem;

performing, by the offload subsystem, data processing tasks for subsequently received data associated with the identified data flow.

31. The integrated processing system of claim 1, wherein the offload subsystem performs the data processing tasks such that data frames no longer go through the main processor.

\* \* \* \* \*